United States Patent
Kojima

(10) Patent No.: US 8,620,210 B2
(45) Date of Patent: Dec. 31, 2013

(54) RADIO COMMUNICATION SYSTEM, MOBILE RELAY STATION, MOBILE STATION, AND RADIO COMMUNICATION METHOD

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 381 days.

(21) Appl. No.: 12/950,147

(22) Filed: Nov. 19, 2010

(65) Prior Publication Data

US 2011/0124330 A1    May 26, 2011

(30) Foreign Application Priority Data

Nov. 20, 2009    (JP) ................. 2009-265170

(51) Int. Cl.
*H04B 7/15* (2006.01)
(52) U.S. Cl.
USPC ....... 455/11.1; 455/404.2; 455/436; 455/437; 455/439; 455/438; 455/441; 455/442
(58) Field of Classification Search
USPC ........................................ 455/11.1
See application file for complete search history.

(56) References Cited

U.S. PATENT DOCUMENTS

2008/0219263 A1    9/2008    Kumazawa et al.
2011/0134887 A1*   6/2011    Jeon et al. .............. 370/331

FOREIGN PATENT DOCUMENTS

| JP | 2006-222726 A | 8/2006 |
| JP | 2006-245824 A | 9/2006 |

* cited by examiner

*Primary Examiner* — Olumide T Ajibade Akonai
*Assistant Examiner* — Randy Peaches
(74) *Attorney, Agent, or Firm* — Fujitsu Patent Center

(57) ABSTRACT

A radio communication system in which a mobile relay station includes a notification unit configured to notify the mobile station of mobility state information of the mobile relay station determined based on a number of base stations selected within a specified time, and the mobile station includes a base station selection processing unit to select the base station based on the mobility state information when the mobile station switches a device to be communicated with from the mobile relay station to the base station.

8 Claims, 14 Drawing Sheets

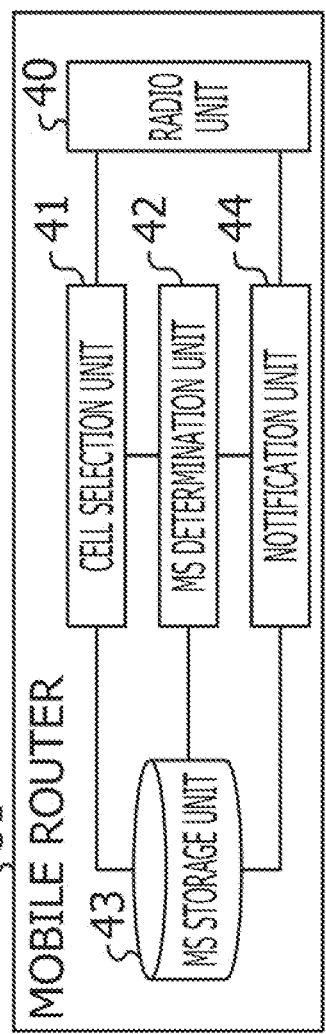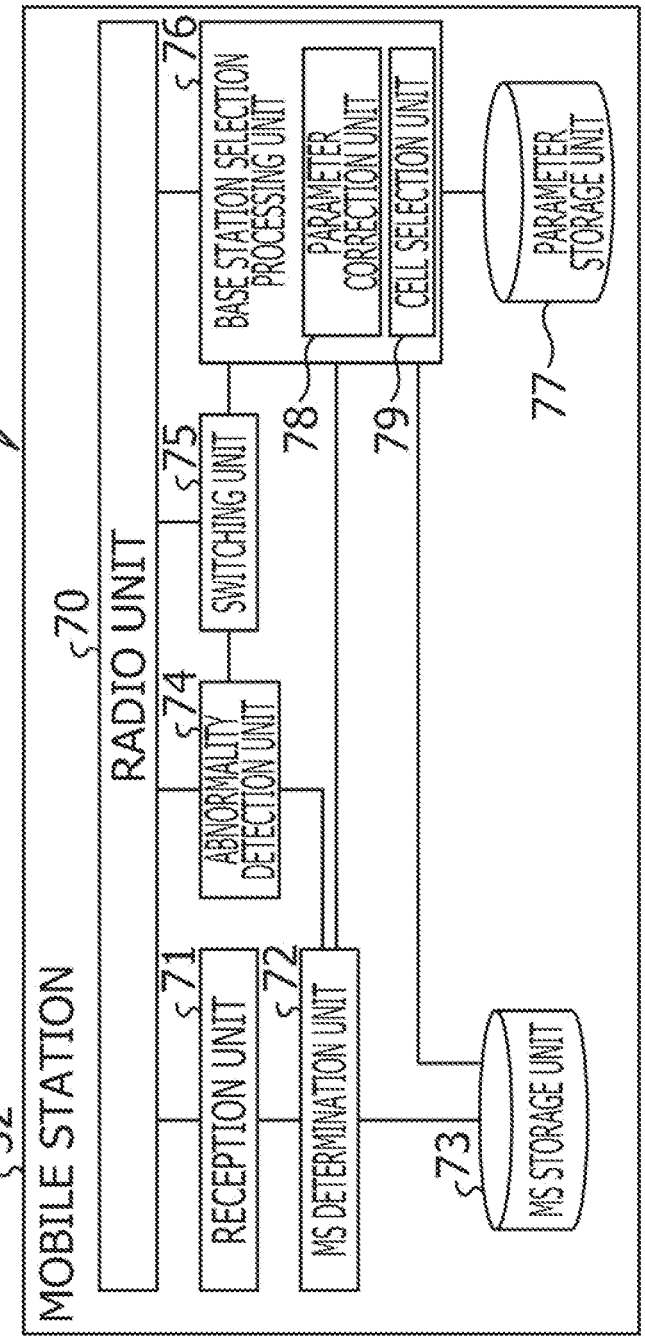
FIG. 3

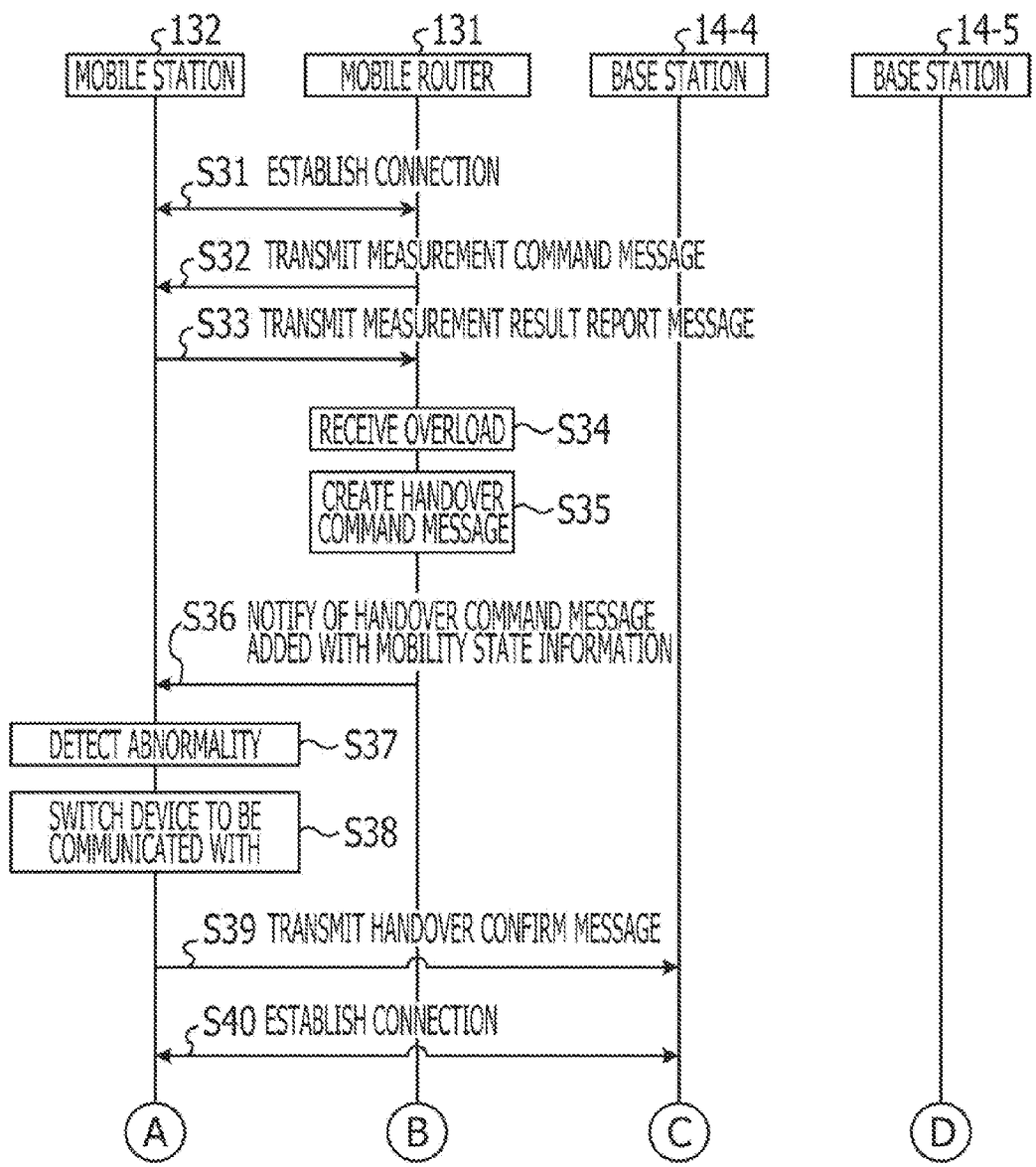

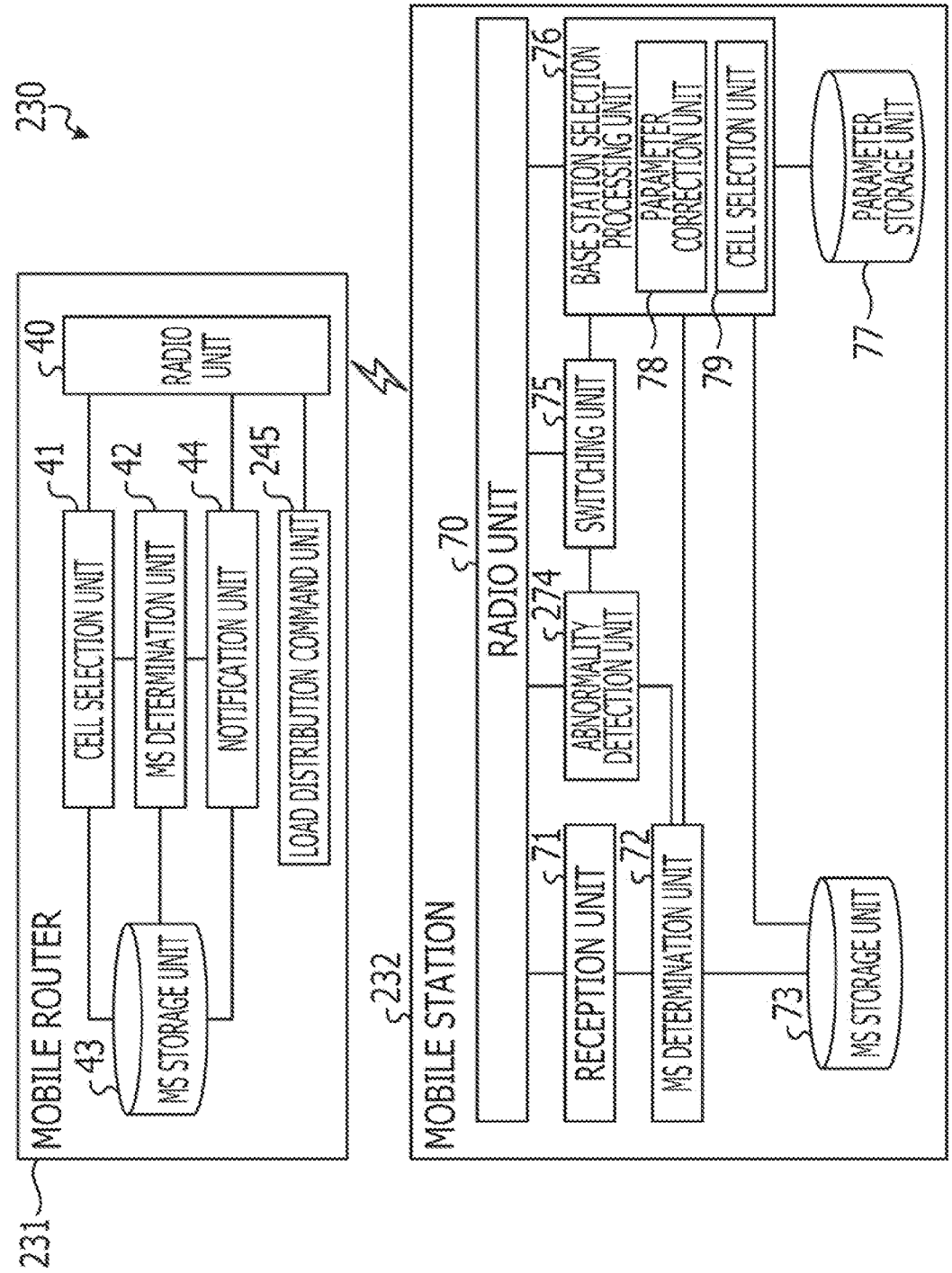

RADIO COMMUNICATION SYSTEM, MOBILE RELAY STATION, MOBILE STATION, AND RADIO COMMUNICATION METHOD

CROSS-REFERENCE TO RELATED APPLICATIONS

This application is based upon and claims the benefit of priority of the prior Japanese Patent Application No. 2009-265170, filed on Nov. 20, 2009, the entire contents of which are incorporated herein by reference.

FIELD

Embodiments of the invention relate to a radio communication system, a mobile relay station, a mobile station, and a radio communication method.

BACKGROUND

In a radio communication system employing a cellular radio communication method, such as LTE (Long Term Evolution), a mobile station selects, from base stations respectively forming cells, a base station having the most favorable quality of communication with the mobile station. For example, the mobile station performs the process of selecting the base station by using a specified evaluation formula for evaluating the quality of communication.

Further, the mobile station holds the mobility state thereof in a specified storage unit, and corrects the evaluation formula in accordance with the mobility state. The mobility state is an indicator relating to the moving speed of the mobile station, and can be determined on the basis of the number of base stations selected within a specified time. Specifically, the mobility state can be determined in three stages of Normal-mobility state indicating low-speed movement, Medium-mobility state indicating medium-speed movement, and High-mobility state indicating high-speed movement in accordance with and in ascending order of the number of base stations selected within a specified time.

FIG. 12 is a diagram illustrating an example of a mobility state determination method performed by a mobile station. During a communication or standby state, a mobile station X illustrated in an upper part of the drawing selects, as devices to be communicated therewith, two base stations a and b within a specified time $\Delta T$. Further, a mobile station Y illustrated in a middle part of the drawing selects three base stations a, b, and c within the specified time $\Delta T$, and a mobile station Z illustrated in a lower part of the drawing selects four base stations a, b, c, and d within the specified time $\Delta T$. Herein, Normal-mobility state refers to a state in which the number of base stations selected within the specified time is two or less. Further, Medium-mobility state refers to a state in which the number of the selected base stations is three, and High-mobility state refers to a state in which the number of the selected base stations is four or more. In this case, the respective mobility states of the mobile stations X, Y, and Z in FIG. 12 are Normal-mobility state, Medium-mobility state, and High-mobility state, respectively.

Further, the mobile station corrects, in accordance with the mobility state thereof, an evaluation formula for evaluating the communication quality of a cell, and ultimately performs the process of selecting the base station by using the corrected evaluation formula. For example, if the mobility state of the mobile station is High-mobility state indicating high-speed movement, the mobile station corrects the evaluation formula such that the communication quality of a cell serving the mobile station is surpassed by the communication quality of a cell neighboring the serving cell. Thereby, the mobile station is allowed to promptly select a base station forming the neighboring cell.

Herein, in next-generation LTE such as LTE-Advanced, a variety of radio communication systems each including a radio relay station that relays radio communication between a base station and a mobile station have been studied. Particularly, a mobile relay station (or "mobile router") provided to (mounted on) transportation, such as a bus and a train, to relay radio communication between a base station and a mobile station that moves along with the movement of the transportation has been drawing attention.

Similarly to the mobile station, the above-described mobile relay station has a mobility state selected from Normal-mobility state, Medium-mobility state, and High-mobility state, and selects the base station in accordance with the mobility state. In this case, the device to be communicated with the mobile station is basically the mobile relay station. Therefore, the mobility state of the mobile station is constantly Normal-mobility state.

SUMMARY

According to an aspect of the embodiment, a radio communication system in which a mobile relay station includes a notification unit to notify the mobile station of mobility state information of the mobile relay station determined based on a number of base stations selected within a specified time, and the mobile station includes a base station selection processing unit to select the base station based on the mobility state information when the mobile station switches a device to be communicated with from the relay station to the base station.

The object and advantages of the embodiment will be realized and attained at least by the elements, features, and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a block diagram illustrating a configuration of a radio communication system according to a second embodiment;

FIGS. 7A and 7B are a sequence diagram illustrating a processing procedure performed by the radio communication system according to the third embodiment;

FIG. 8 is a block diagram illustrating a configuration of a radio communication system according to a fourth embodiment;

DESCRIPTION OF EMBODIMENTS

Figure 13:
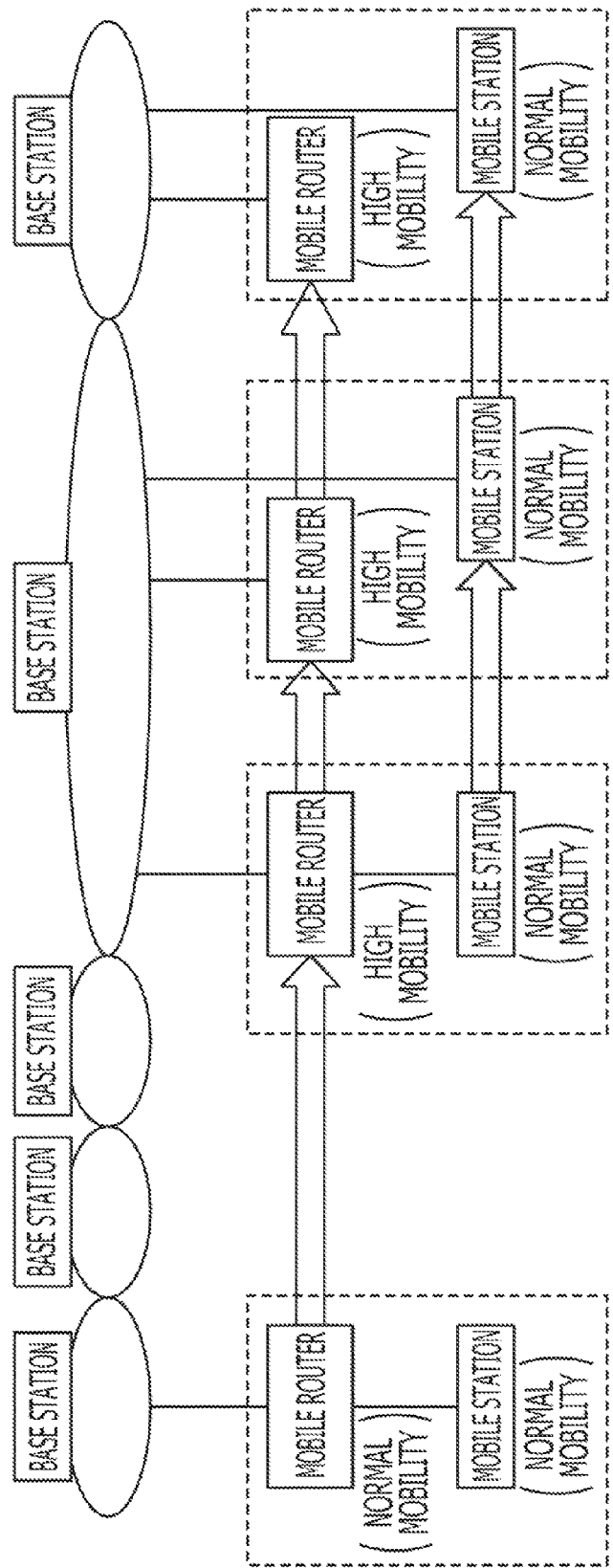
FIG. 13 is a diagram illustrating an issue of an existing radio communication system.

The existing radio communication system including the above-described mobile router, however, has an issue of delay in the cell selection by the mobile station, which occurs in the event of an abnormality in the mobile relay station. The issue will be described in further detail with reference to FIG. 13. FIG. 13 is a diagram illustrating the issue of the existing radio communication system including the mobile relay station.

As illustrated in the drawing, the mobility state of the mobile router is Normal-mobility state in an initial state in which the transportation moves at low speed. Thereafter, along with an increase in the moving speed of the transportation, the mobile router selects four base stations within a specified time. Thereby, the mobility state of the mobile router shifts to High-mobility state indicating high-speed movement.

Meanwhile, the mobile station that moves along with the movement of the transportation as mounted on the transportation, for example, maintains the most favorable quality of radio communication with the mobile relay station, whether the transportation moves at either low speed or high speed. Therefore, the mobile station continues to select the mobile relay station as the device to be communicated therewith. As a result, the mobility state of the mobile station remains to be Normal-mobility state indicating low-speed movement.

As described above, if the moving speed of the transportation is high, the mobility state of the mobile relay station is High-mobility state, while the mobility state of the mobile station is Normal-mobility state. If an abnormality occurs in the mobile relay station while the transportation is moving at a high speed, the mobile station is no longer able to select the mobile relay station as the device to be communicated therewith. Thus, the mobile station switches the device to be communicated therewith from the mobile relay station to a base station. With the single switch to a base station, however, the mobility state does not shift to High-mobility state. Therefore, the mobile station performs the base station selection in Normal-mobility state until the shift of the mobility state. As a result, the cell selection process by the mobile station is delayed. In the worst case, the radio communication between the mobile station and the base station is cut off.

In the view of the above, an object of an aspect of the invention is to provide a radio communication system, a mobile relay station, a mobile station, and a radio communication method capable of promptly selecting an appropriate cell, even if the mobile station switches the device to be communicated therewith from the mobile relay station to the base station.

According to a first proposal, in a radio communication system, a mobile relay station provided to a transportation relays radio communication between a base station and a mobile station that moves along with the movement of the transportation. The mobile relay station includes a notification unit configured to notify the mobile station of mobility state information of the mobile relay station determined on the basis of the number of base stations selected within a specified time. The mobile station includes a base station selection processing unit configured to perform, provided that a device to be communicated by radio with the mobile station is switched from the mobile relay station to the base station, a process of selecting the base station on the basis of the mobility state information notified from the mobile relay station.

It is therefore possible to promptly select an appropriate cell, even if the mobile station switches the device to be communicated therewith from the mobile relay station to the base station.

On the basis of the drawings, a detailed description will be made below of embodiments of a radio communication system, a mobile relay station, a mobile station, and a radio communication method. In the following embodiments, description will be made of an example in which the radio communication system, the mobile relay station, the mobile station, and the radio communication method disclosed by the present application are applied to LTE (Long Term Evolution). However, the radio communication system, the mobile relay station, the mobile station, and the radio communication method are, as obvious from the mechanism thereof, also applicable to a mobile radio communication system employing a cellular method other than LTE, in which the mobile relay station is introduced.

Figure 1:
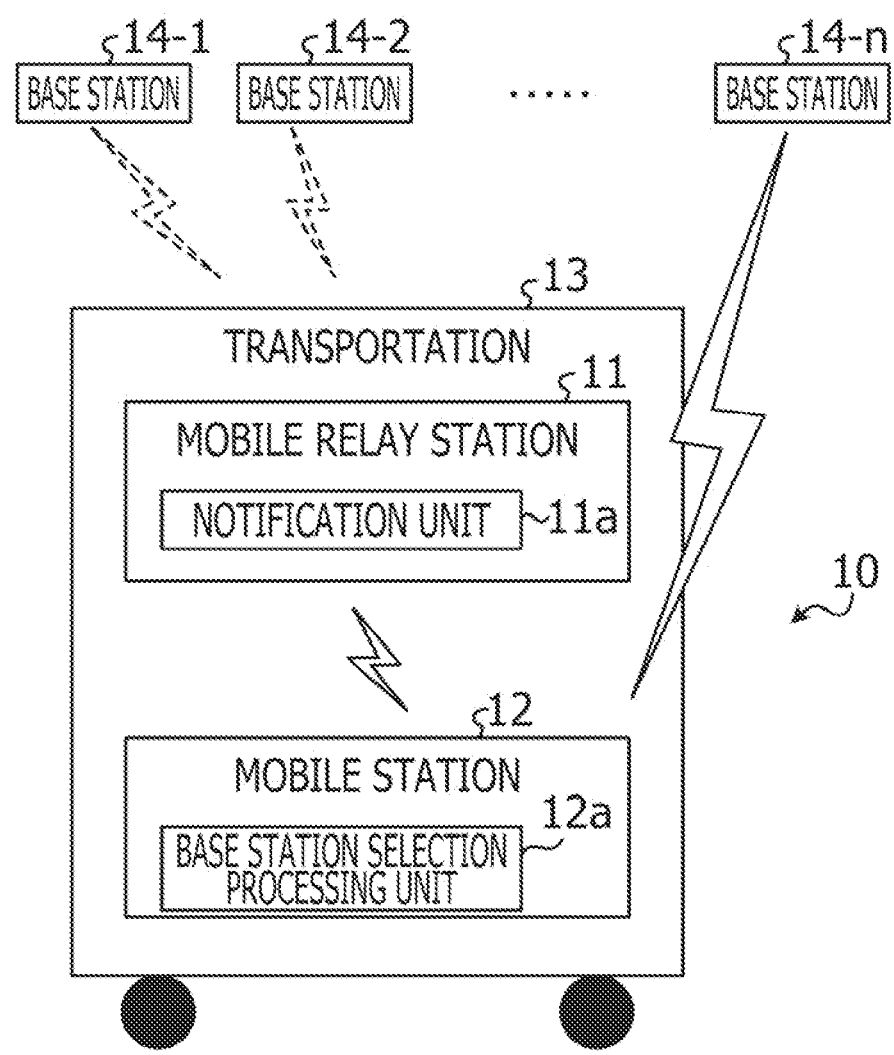
FIG. 1 is a block diagram illustrating a configuration of a radio communication system according to a first embodiment.

A configuration of a radio communication system according to a first embodiment will be first described. FIG. 1 is a block diagram illustrating a configuration of the radio communication system according to the first embodiment. As illustrated in the drawing, a radio communication system 10 according to the first embodiment includes a mobile relay station 11 and a mobile station 12.

The mobile relay station 11 is provided to (mounted on) a transportation 13, such as a train or a bus, to relay radio communication between base stations 14-1 to 14-$n$ and the mobile station 12 (e.g., mobile station carried by a user boarding the transportation) that moves along with the movement of the transportation 13, and includes a notification unit 11$a$. The mobile relay station 11 may be a mobile router. The notification unit 11$a$ notifies the mobile station 12, which moves along with the movement of the transportation 13, of mobility state information representing the mobility state of the mobile relay station 11 determined on the basis of the number of base stations selected from the base stations 14-1 to 14-$n$ within a specified time.

Meanwhile, the mobile station 12 is a communication device possessed by a passenger of the transportation 13 provided with the mobile relay station 11, e.g., a mobile terminal device. The mobile station 12 includes a base station selection processing unit 12$a$. The base station selection processing unit 12$a$ performs, provided that a device to be communicated by radio with the mobile station 12 is switched from the mobile relay station 11 to one of the base stations 14-1 to 14-$n$, a process of selecting the one of the base stations 14-1 to 14-$n$ on the basis of the mobility state information notified from the mobile relay station 11.

For example, the notification unit 11$a$ of the mobile relay station 11 may have a radio interface-related configuration thereof formed by a radio module and the remaining configuration thereof executed by hardware implementation using a logic integrated circuit (IC), such as an ASIC (Application Specific Integrated Circuit) or an FPGA (Field Programmable Gate Array), or realized by a DSP (Digital Signal Processor). Further, the base station selection processing unit 12a of the mobile station 12 may be executed by hardware implementation using a logic IC, such as an ASIC (Application Specific Integrated Circuit) or an FPGA (Field Programmable Gate Array), or realized by a DSP (Digital Signal Processor).

Figure 2:
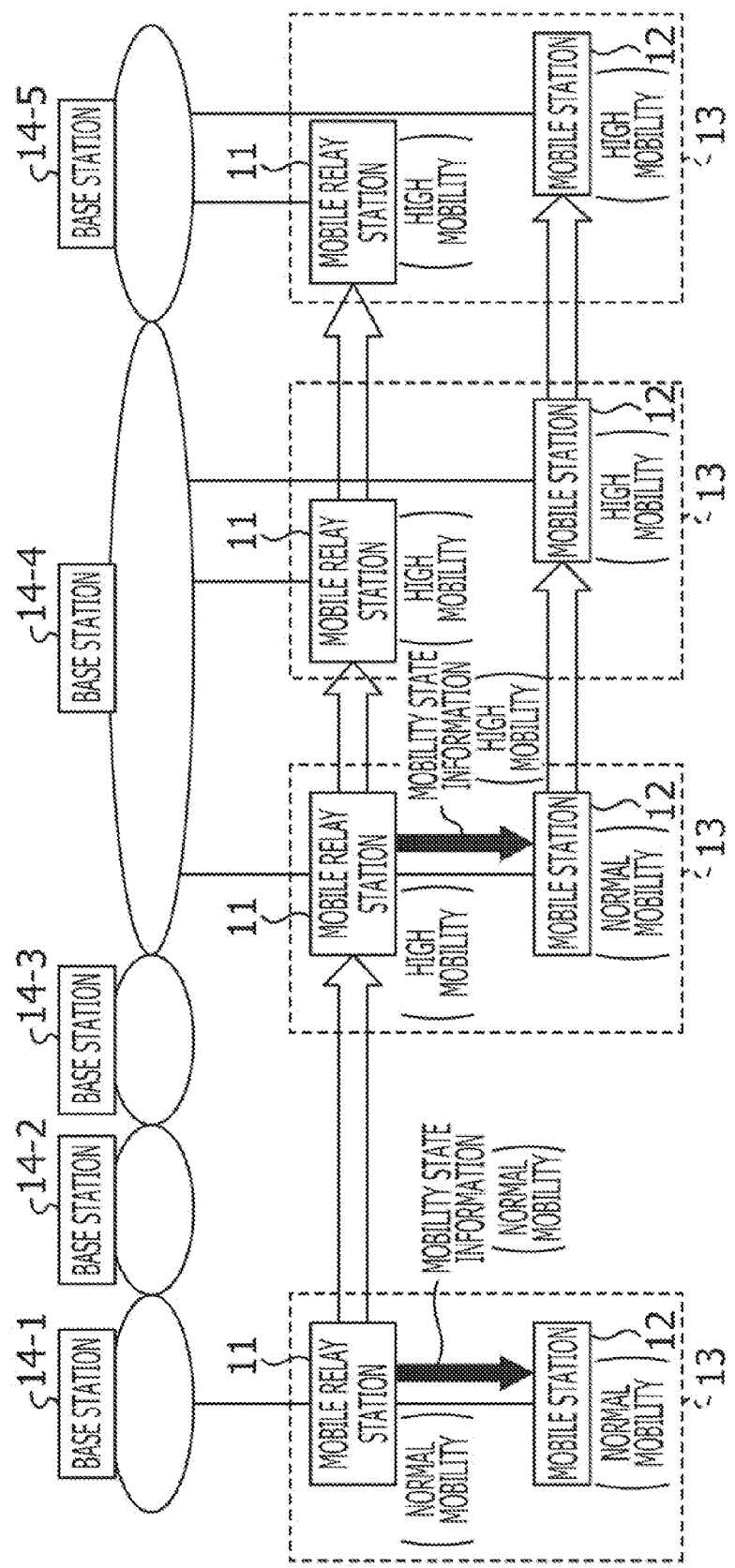
FIG. 2 is a diagram illustrating an example of radio communication processing performed by the radio communication system according to the first embodiment.

Subsequently, the radio communication processing performed by the radio communication system 10 according to the first embodiment will be described with reference to an example. FIG. 2 is a diagram illustrating an example of the radio communication processing performed by the radio communication system 10 according to the first embodiment.

In the example of FIG. 2, at an initial stage in which the cell formed by the base station 14-1 is selected by the mobile relay station 11, the mobility state of the mobile relay station 11 is Normal-mobility state indicating low-speed movement. That is, high-speed movement has not been detected yet. At this stage, the notification unit 11a of the mobile relay station 11 notifies the mobile station 12, which moves along with the movement of the transportation 13, of mobility state information representing Normal-mobility state as the mobility state.

Then, as the mobile relay station 11 moves to the cell formed by the base station 14-4 via the respective cells formed by the base stations 14-1 to 14-3, the number of base stations selected within a specified time (the number of base stations selected as the base stations to be communicated with) is increased. Therefore, the mobility state of the mobile relay station 11 shifts from Normal-mobility state indicating low-speed movement to High-mobility state indicating high-speed movement. In this process, the notification unit 11a of the mobile relay station 11 notifies the mobile station 12, which moves along with the movement of the transportation 13, of mobility state information representing High-mobility state as the mobility state.

Then, if an abnormality occurs in the mobile relay station 11, which has moved to the cell formed by the base station 14-4, the mobile station 12 switches the device to be communicated therewith by radio from the mobile relay station 11 to, for example, the base station 14-4 (or a base station in communication with the mobile relay station 11 immediately before the occurrence of the abnormality in the mobile relay station 11). Then, provided that the device to be communicated with by radio is switched to the base station 14-4, the base station selection processing unit 12a of the mobile station 12 performs the process of selecting the base station on the basis of the mobility state information notified from the mobile relay station 11. In the example of FIG. 2, on the basis of High-mobility state, which is the mobility state of the mobile relay station 11 represented by the mobility state information notified from the mobile relay station 11, the mobile station 12 performs a process for facilitating the switch to the base station determined as the device to be communicated with. For example, the mobile station 12 changes a first algorithm used in Normal-mobility state to make a switch from the serving base station to the neighboring base station to a second algorithm used in High-mobility state to make a switch from the serving base station to the neighboring base station. The second algorithm is an algorithm for facilitating the switch to the neighboring base station more than the first algorithm. For example, when the setting is made such that the switching between the base stations occurs if the quality of communication with the neighboring base station exceeds the quality of communication with the serving base station by more than a specified offset value, the offset value is set to be smaller in the second algorithm than in the first algorithm. Needless to say, the offset value may be unchanged, and instead the quality of communication with the neighboring base station may be added with a specified value in the second algorithm but not in the first algorithm. The above selection process is based on the condition that the device to be communicated with is switched from the mobile relay station 11 to a base station. Therefore, in the selection of still another base station, such as the base station 14-5, after the switch to the base station 14-4, the switching of the base station to be communicated with may be performed on the basis of High-mobility state. The above selection process is based on the condition that the device to be communicated with is switched from the mobile relay station 11 to a base station. In the first switch from the mobile relay station 11 to the base station 14-4, however, the selection may be made on the basis of Normal-mobility state, and High-mobility state may be selected in a subsequent selection.

As described above, the radio communication system 10 according to the first embodiment performs, provided that the device to be communicated with the mobile station 12 is switched from the mobile relay station 11 to a base station, the process of selecting a base station by using the mobility state notified from the mobile relay station 11. In the radio communication system 10, therefore, the mobile station 12 is capable of selecting the next device to be connected thereto by using the mobility state that changes in accordance with the movement of the mobile relay station 11. Consequently, the radio communication system 10 is capable of achieving prompt selection of a cell by the mobile station 12, even if the mobile station 12 switches the device to be communicated therewith from the mobile relay station 11 to a base station.

Subsequently, a radio communication system according to a second embodiment will be described. The radio communication system according to the second embodiment performs, when the device to be communicated with the mobile station set in Idle mode (or standby state) is switched from the mobile relay station to a base station, the process of selecting the base station by using the mobility state notified from the mobile relay station.

[Configuration of Radio Communication System According to Second Embodiment]

Subsequently, a configuration of the radio communication system according to the second embodiment will be described. FIG. 3 is a block diagram illustrating a configuration of a radio communication system 30 according to the second embodiment. As illustrated in the drawing, the radio communication system 30 according to the second embodiment includes a mobile relay station (or a mobile router) 31 and a mobile station 32. The mobile station 32 illustrated in FIG. 3 is assumed to be set in Idle mode specified by LTE.

The mobile router 31 is provided to a transportation, such as a train or a bus, and relays a variety of information, such as report information, exchanged between a base station and the mobile station 32 located in the cell of the mobile relay station. The mobile router 31 includes a radio unit 40, a cell selection unit 41, an MS (Mobility State) determination unit 42, an MS storage unit 43, and a notification unit 44. The radio unit 40 forms radio links with the mobile station 32 and base stations, and transmits and receives a variety of data through the formed radio links.

The cell selection unit 41 performs a process of selecting a base station forming the cell serving the mobile router 31. Specifically, in accordance with the mobility state stored in the MS storage unit 43, the cell selection unit 41 corrects a parameter included in a specified evaluation formula for evaluating the communication quality of a cell, and performs the process of selecting a base station by using the evaluation formula including the corrected parameter.

The MS determination unit 42 determines the mobility state of the mobile router 31 on the basis of the number of cells selected per specified time by the cell selection unit 41, e.g., the number of base stations selected within the specified time, and stores the determined mobility state in the MS storage unit 43. For example, the MS determination unit 42 determines the mobility state of the mobile router 31 in three stages of Normal-mobility state, Medium-mobility state, and High-mobility state in ascending order of the number of base stations selected within a specified time. The mobility state may also be divided into two stages of Low and High or into four or more stages.

Further, the MS determination unit 42 acquires the combination of the identifier of the base station forming the cell selected by the cell selection unit 41 and the time of connection to the base station, and stores the combination in the MS storage unit 43 together with the mobility state. Specifically, every time the cell selection unit 41 selects a new cell, the MS determination unit 42 acquires the combination of the identifier of a new base station forming the selected cell and the time of connection to the base station, and stores the combination in the MS storage unit 43 together with the mobility state. Further, as long as the mobile router 31 is connected to the base station, the MS determination unit 42 performs, at appropriate times, the acquisition of the time of connection and the updating of the time of connection stored in the MS storage unit 43. The combination of the identifier of the base station forming the cell selected by the cell selection unit 41 and the time of connection to the base station will be hereinafter referred to as the "cell selection history".

The MS storage unit 43 stores the mobility state and the cell selection history. Specifically, the MS storage unit 43 stores the latest mobility state determined by the MS determination unit 42. For example, if the number of cells selected per specified time by the cell selection unit 41 is increased after the determination of the mobility state as Normal-mobility state, the MS determination unit 42 newly determines the mobility state as High-mobility state, and stores the new mobility state in the MS storage unit 43. Further, the MS storage unit 43 stores, in a cumulative manner, a plurality of cell selection histories acquired by the MS determination unit 42.

The notification unit 44 notifies the mobile station 32 of the mobility state information representing the mobility state of the mobile router 31. Specifically, the notification unit 44 reads and combines the mobility state of the mobile router 31 and the cell selection history stored in the MS storage unit 43 by the MS determination unit 42, to thereby create the mobility state information. Then, the notification unit 44 notifies the mobile station 32 of the created mobility state information. Further, the notification unit 44 intermittently notifies, by broadcasting, the mobile station 32 of the mobility state information during the period in which the mobile station 32 receives radio transmission from the mobile router 31.

Figure 4:
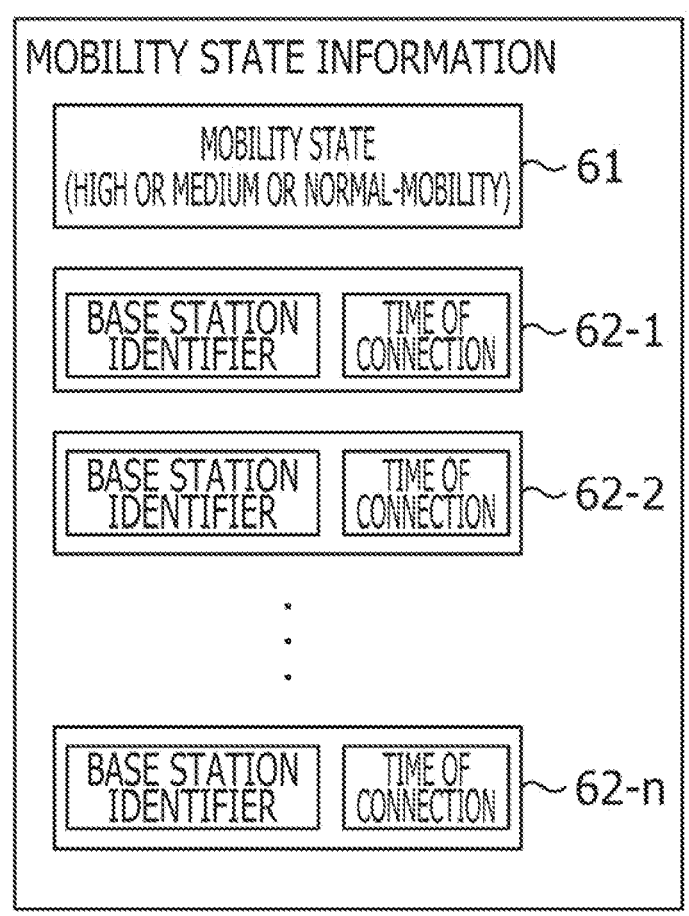
FIG. 4 is a diagram illustrating a configuration example of mobility state information.

FIG. 4 is a diagram illustrating a configuration example of the mobility state information. As illustrated in the drawing, the mobility state information is formed by the combination of a mobility state 61 of the mobile router 31 and cell selection histories 62-1 to 62-n. The mobility state 61 of the mobile router 31 is the latest mobility state determined by the MS determination unit 42. The cell selection histories 62-1 to 62-n are the accumulation of cell selection histories acquired by the MS determination unit 42.

Each of the cell selection unit 41, the MS determination unit 42, and the notification unit 44 may be configured as an integrated circuit, such as an ASIC (Application Specific Integrated Circuit) or an FPGA (Field Programmable Gate Array), for example. Further, the MS storage unit 43 may be configured as a semiconductor memory element, such as a RAM (Random Accesses Memory), an EPROM (Erasable Programmable Read Only Memory), or a flash memory, for example.

Referring again to FIG. 3, the mobile station 32 is a device which performs direct radio communication with a base station and transmits and receives a variety of information, such as report information, to and from the base station via the mobile router 31 provided to a transportation. The mobile station 32 is a mobile terminal device, for example. The mobile station 32 includes a radio unit 70, a reception unit 71, an MS determination unit 72, an MS storage unit 73, an abnormality detection unit 74, a switching unit 75, a base station selection processing unit 76, and a parameter storage unit 77. The radio unit 70 forms radio links with the mobile router 31 and base stations, and transmits and receives a variety of data through the formed radio links. The reception unit 71 receives the mobility state information of the mobile router 31 notified from the mobile router 31, and notifies the MS determination unit 72 of the received mobility state information.

The MS determination unit 72 determines the mobility state of the mobile station 32 in accordance with the number of cells selected per specified time by the base station selection processing unit 76, and stores the determined mobility state in the MS storage unit 73 described later. For example, if the cell of the mobile router 31 is selected by the base station selection processing unit 76, the number of cells selected per specified time is one. Therefore, the MS determination unit 72 determines the mobility state of the mobile station 32 as Normal-mobility state indicating low-speed movement, and stores the determined mobility state in the MS storage unit 73.

Further, if abnormality of the mobile router 31 is detected by the abnormality detection unit 74, the MS determination unit 72 determines, as the mobility state of the mobile station 32, the mobility state of the mobile router 31 represented by the mobility state information, and stores the determined mobility state in the MS storage unit 73. For example, if the mobility state of the mobile station 32 already stored in the MS storage unit 73 is Normal-mobility state, and if the mobility state represented by the mobility state information of the mobile router 31 is High-mobility state, the MS determination unit 72 stores High-mobility state in the MS storage unit 73.

Further, if abnormality of the mobile router 31 is detected by the abnormality detection unit 74, the MS determination unit 72 acquires, from the cell selection history represented by the mobility state information transmitted from the reception unit 71, the number of cells selected per specified time by the mobile router 31. Then, the MS determination unit 72 continuously updates the mobility state of the mobile station 32 in accordance with the acquired number of cells per specified time. For example, in the above-described example, High-mobility state is stored as the mobility state in the MS storage unit 73, and thereafter the MS determination unit 72 acquires, from the cell selection history represented by the mobility state information, the number of cells selected per specified time by the mobile router 31. Then, in accordance with the acquired number of cells per specified time, the MS determination unit 72 updates the mobility state, which is High-mobility state. Thereafter, the MS determination unit 72 updates the mobility state of the mobile station 32 in accordance with the number of cells selected per specified time by the base station selection processing unit 76.

The abnormality detection unit 74 detects abnormality of the mobile router 31. Specifically, the abnormality detection unit 74 receives a parameter of a later-described cell selection evaluation formula periodically transmitted from the mobile router 31. Then, if the amount of change in the received parameter of the cell selection evaluation formula exceeds a specified threshold value, the abnormality detection unit 74 detects the occurrence of an overload on the mobile router 31 as the abnormality. For example, if the amount of reduction in hysteresis or offset included in the parameters of the cell selection evaluation formula exceeds a specified threshold value, the abnormality detection unit 74 detects the overload on the mobile router 31. The reduction in hysteresis or offset included in the parameters of the cell selection evaluation formula indicates that the mobile router 31 prompts the mobile station 32 to switch the device to be communicated with to a base station. Further, upon detection of abnormality of the mobile router 31, the abnormality detection unit 74 notifies the MS determination unit 72 and the switching unit 75 of the detection of abnormality.

If abnormality of the mobile router 31 is detected by the abnormality detection unit 74, the switching unit 75 switches the device to be communicated by radio with the mobile station 32 from the mobile router 31 to a base station. For example, if abnormality of the mobile router 31 is detected by the abnormality detection unit 74, the switching unit 75 commands the base station selection processing unit 76 to forcibly select the cell of the base station connected to the mobile router 31, to thereby switch the device to be communicated with the mobile station 32 to the base station. Needless to say, the device to be communicated with may be switched to another base station, instead of being forcibly switched to the base station.

The base station selection processing unit 76 performs, provided that the switching unit 75 switches the device to be communicated with by radio from the mobile router 31 to a base station, the process of selecting the base station on the basis of the mobility state information notified from the mobile router 31. The selection process may be performed in the switching process from the mobile router 31 to the base station. The selection process may also be performed after the switching process. The base station selection processing unit 76 may include a parameter correction unit 78 and a cell selection unit 79.

The parameter correction unit 78 corrects a parameter included in the cell selection evaluation formula in accordance with the mobility state of the mobile router 31 represented by the mobility state information stored in the MS storage unit 73. Herein, the cell selection evaluation formula is a commonly used evaluation formula for evaluating the communication quality of a cell in the mobile station 32 in Idle mode. The cell selection evaluation formula is represented by, for example, the following formulae (1) and (2).

$$Rs = Qmeas,s + Qhyst \quad (1)$$

$$Rn = Qmeas,n - Qoffset \quad (2)$$

Herein, Rs represents the cell ranking criterion of the serving cell, and Rn represents the cell ranking criterion of the neighboring cell. Further, Qmeas,s represents the radio field strength of transmitted radio waves in the serving cell, and Qmeas,n represents the radio field strength of transmitted radio waves in the neighboring cell. Further, Qhyst represents the hysteresis, and Qoffset represents the offset.

Specifically, the parameter correction unit 78 multiplies a parameter, such as the hysteresis and the offset, included in the cell selection evaluation formula by a correction coefficient preset in accordance with the mobility state, to thereby correct the parameter included in the cell selection evaluation formula. For example, if the mobility state is Normal-mobility state indicating low-speed movement, the parameter correction unit 78 does not make a particular correction. Meanwhile, if the mobility state is High-mobility state indicating high-speed movement, the parameter correction unit 78 multiplies the hysteresis by a correction coefficient for increasing the cell ranking criterion of the neighboring cell to be higher than the cell ranking criterion of the serving cell. Then, the parameter correction unit 78 stores the corrected parameter in the parameter storage unit 77.

The cell selection unit 79 reads from the parameter storage unit 77 the parameter corrected by the parameter correction unit 78, and performs the process of selecting the base station by using the cell selection evaluation formula including the corrected parameter. Specifically, with the use of the cell selection evaluation formula including the corrected parameter, the cell selection unit 79 calculates the respective cell ranking criteria of the serving cell serving the mobile station 32 and the neighboring cell neighboring the serving cell. Then, the cell selection unit 79 compares the calculated cell ranking criteria of the serving cell and the neighboring cell, and selects, for a specified time, the base station forming the cell having the higher cell ranking criterion.

The parameter storage unit 77 is a storage unit for storing the parameter corrected by the parameter correction unit 78. Specifically, the parameter storage unit 77 stores the parameters of the cell selection evaluation formula corrected by the parameter correction unit 78, such as the hysteresis and the offset.

Each of the reception unit 71, the MS determination unit 72, the abnormality detection unit 74, the switching unit 75, and the base station selection processing unit 76 is an integrated circuit, such as an ASIC or an FPGA, for example. Further, each of the MS storage unit 73 and the parameter storage unit 77 is a semiconductor memory element, such as a RAM, an EPROM, or a flash memory, for example.

[Processing Procedure by Radio Communication System According to Second Embodiment]

Figure 5:
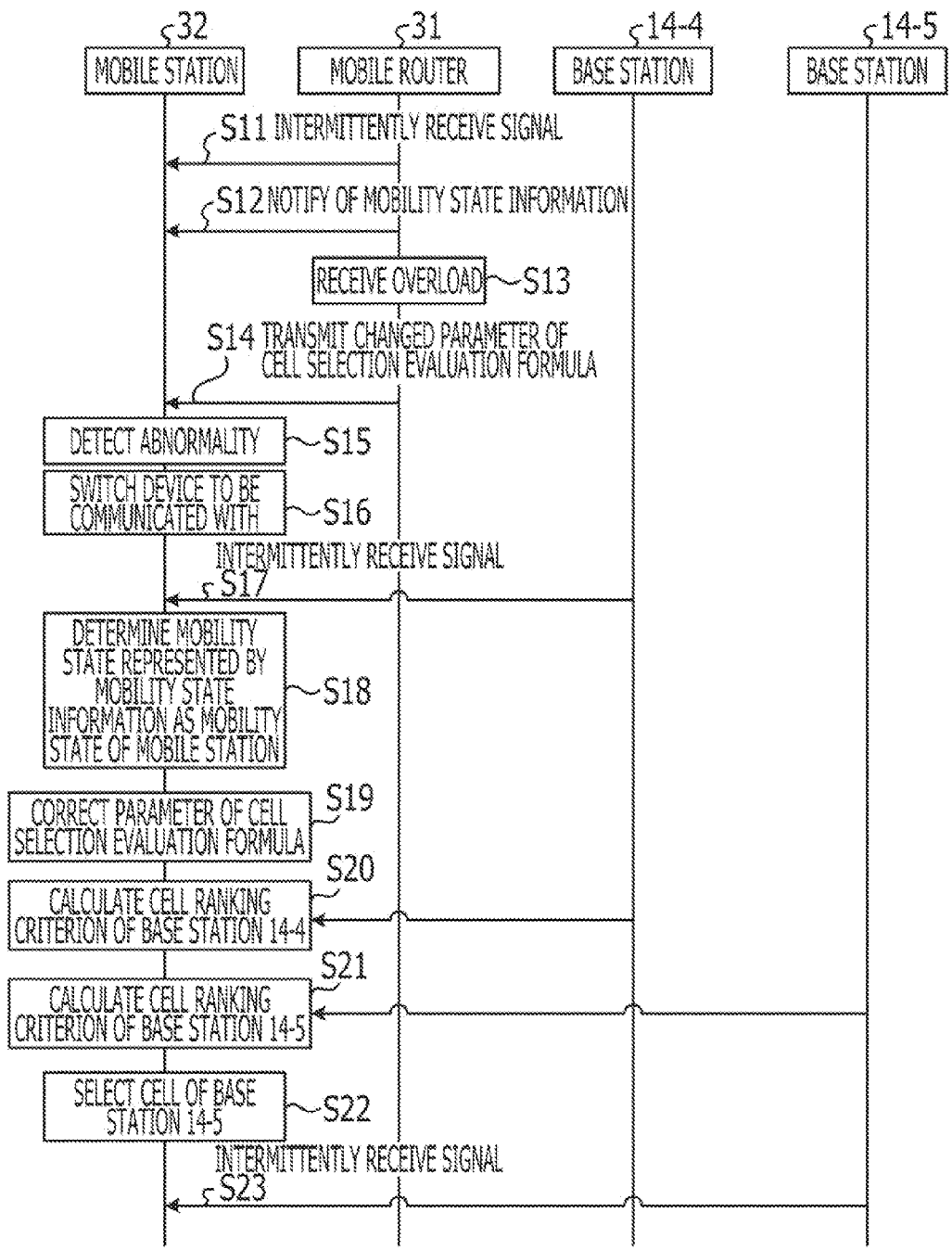
FIG. 5 is a sequence diagram illustrating a processing procedure performed by the radio communication system according to the second embodiment.

Subsequently, a processing procedure performed by the radio communication system 30 according to the second embodiment will be described. FIG. 5 is a sequence diagram illustrating a processing procedure performed by the radio communication system 30 according to the second embodiment. In FIG. 5, description will be made of a processing procedure in which the mobile station 32 corresponding to the mobile station 12 illustrated in FIG. 2 switches the device to be communicated therewith in the order of the mobile router 31 corresponding to the mobile relay station 11, the base station 14-4, and the base station 14-5. Further, the mobile router 31 is assumed to be connected to the cell of the base station 14-4. It is also assumed that the mobility state of the mobile router 31 connected to the cell of the base station 14-4 is High-mobility state, and that the mobility state of the mobile station 32 connected to the cell of the mobile router 31 is Normal-mobility state.

As illustrated in FIG. 5, the mobile station 32 intermittently receives a signal for broadcasting from the mobile router 31, which is the device to be communicated with (Operation S11). Then, the notification unit 44 of the mobile router 31 notifies, by broadcasting, the mobile station 32 of the mobility state information including the mobility state of the mobile router 31 (High-mobility state in this case) and the cell selection history (Operation S12). Then, the reception unit 71 of the mobile station 32 notifies the MS determination unit 72 of the mobility state information received from the mobile router 31.

Thereafter, if an overload is imposed on the mobile router 31 (Operation S13), the mobile router 31 changes a parameter of the cell selection evaluation formula to prompt the mobile station 32 to switch the device to be communicated with to the base station 14-4, and transmits the changed parameter to the mobile station 32 (Operation S14). The change of a parameter of the cell selection evaluation formula includes, for example, a reduction in hysteresis or offset performed to increase the cell ranking criterion of the cell of the base station 14-4 to be higher than the cell ranking criterion of the cell of the mobile router 31.

Meanwhile, as the amount of change in the parameter of the cell selection evaluation formula received from the mobile router 31 has exceeded a specified threshold value, the abnormality detection unit 74 of the mobile station 32 detects abnormality of the mobile router 31 (Operation S15). For example, if the amount of reduction in the hysteresis or offset included in the parameters of the cell selection evaluation formula exceeds a specified threshold value, the abnormality detection unit 74 detects the overload on the mobile router 31 as abnormality.

Then, notified from the abnormality detection unit 74 that abnormality of the mobile router 31 has been detected, the switching unit 75 switches the device to be communicated with the mobile station 32 from the mobile router 31 to the base station 14-4 (Operation S16). As a result, the mobile station 32 intermittently receives a signal for broadcasting from the base station 14-4, which is a new device to be communicated with (Operation S17).

Meanwhile, notified from the abnormality detection unit 74 that abnormality of the mobile router 31 has been detected, the MS determination unit 72 determines, as the mobility state of the mobile station 32, the mobility state represented by the mobility state information notified at Operation S12 (Operation S18). In this case, High-mobility state, which is the mobility state of the mobile router 31 represented by the mobility state information, is determined as the mobility state of the mobile station 32. Thereby, the mobility state of the mobile station 32 is changed from Normal-mobility state indicating low-speed movement to High-mobility state indicating high-speed movement.

In the process of Operation S18, the MS determination unit 72 acquires, from the cell selection history represented by the mobility state information notified at Operation S12, the number of cells selected per specified time by the mobile router 31. Then, the MS determination unit 72 continuously updates the mobility state of the mobile station 32 in accordance with the acquired number of cells per specified time.

Then, the parameter correction unit 78 of the base station selection processing unit 76 corrects the parameter included in the cell selection evaluation formula in accordance with the mobility state of the mobile router 31 determined as the mobility state of the mobile station 32 by the MS determination unit 72 (Operation S19). In this case, the mobility state of the mobile station 32 is High-mobility state. Therefore, the parameter correction unit 78 multiplies the hysteresis by a correction coefficient for increasing the cell ranking criterion of the cell of the neighboring base station 14-5 to be higher than the cell ranking criterion of the cell of the base station 14-4, which is the device to be communicated with.

Then, with the use of the cell selection evaluation formula including the corrected parameter, the cell selection unit 79 of the base station selection processing unit 76 calculates the cell ranking criterion of the cell of the base station 14-4 serving the mobile station 32 (Operation S20). Similarly, with the use of the cell selection evaluation formula including the corrected parameter, the cell selection unit 79 of the base station selection processing unit 76 calculates the cell ranking criterion of the cell of the base station 14-5 neighboring the base station 14-4 (Operation S21).

Thereafter, the cell selection unit 79 compares the cell ranking criterion of the cell of the base station 14-4 with the cell ranking criterion of the cell of the base station 14-5, and selects, for a specified time, the cell of the base station 14-5 having the higher cell ranking criterion (Operation S22). As a result, the mobile station 32 intermittently receives a signal for broadcasting from the base station 14-5, which is a new device to be communicated with (Operation S23).

[Effects of Second Embodiment]

As described above, when the device to be communicated with the mobile station 32 is switched from the mobile router 31 to a base station, the radio communication system 30 according to the second embodiment performs the process of selecting the base station by using the mobility state notified from the mobile router 31. According to the second embodiment, therefore, the mobile station 32 is capable of selecting the next device to be connected thereto by using substantially the same mobility state as the mobility state of the mobile router 31. As a result, the second embodiment is capable of achieving prompt selection of a cell by the mobile station 32, even if the mobile station 32 switches the device to be communicated therewith from the mobile router 31 to a base station.

Further, if the mobile station 32 forcibly switches the device to be communicated therewith from the mobile router 31 to a base station upon detection of an overload as abnormality of the mobile router 31, the second embodiment is capable of achieving prompt selection of a cell by the mobile station 32, even if the mobile station 32 switches the device to be communicated therewith from the mobile router 31 to the base station owing to the occurrence of the overload on the mobile router 31. As a result, the communication quality is improved, and a possibility of cut-off of the communication may be reduced or prevented.

Further, in the radio communication system 30, in accordance with the mobility state represented by the mobility state information notified from the mobile router 31, the mobile station 32 corrects a parameter included in the cell selection evaluation formula for Idle mode. Then, with the use of the cell selection evaluation formula including the corrected parameter, the mobile station 32 selects, from the cells formed by base stations, the cell to be connected thereto. Therefore, the second embodiment is capable of achieving prompt selection of a cell by the mobile station 32, even if the mobile station 32 in Idle mode specified by LTE switches the device to be communicated therewith from the mobile router 31 to a base station.

Third Embodiment

In the above-described second embodiment, description has been made of the example in which the mobile station 32 in Idle mode corrects a parameter included in the cell selection evaluation formula in accordance with the mobility state notified from the mobile router 31, and selects the cell of the device to be connected thereto by using the corrected cell selection evaluation formula. However, the mobile station in Active mode may correct a parameter included in a measurement result report evaluation formula in accordance with the mobility state notified from the mobile router, and may select the cell of the device to be connected thereto by using the corrected measurement result report evaluation formula. In a third embodiment, therefore, description will be made of an example in which the mobile station in Active mode corrects a parameter included in the measurement result report evaluation formula in accordance with the mobility state notified from the mobile router and selects the cell of the device to be connected thereto by using the corrected measurement result report evaluation formula.

[Configuration of Radio Communication System According to Third Embodiment]

Figure 6:
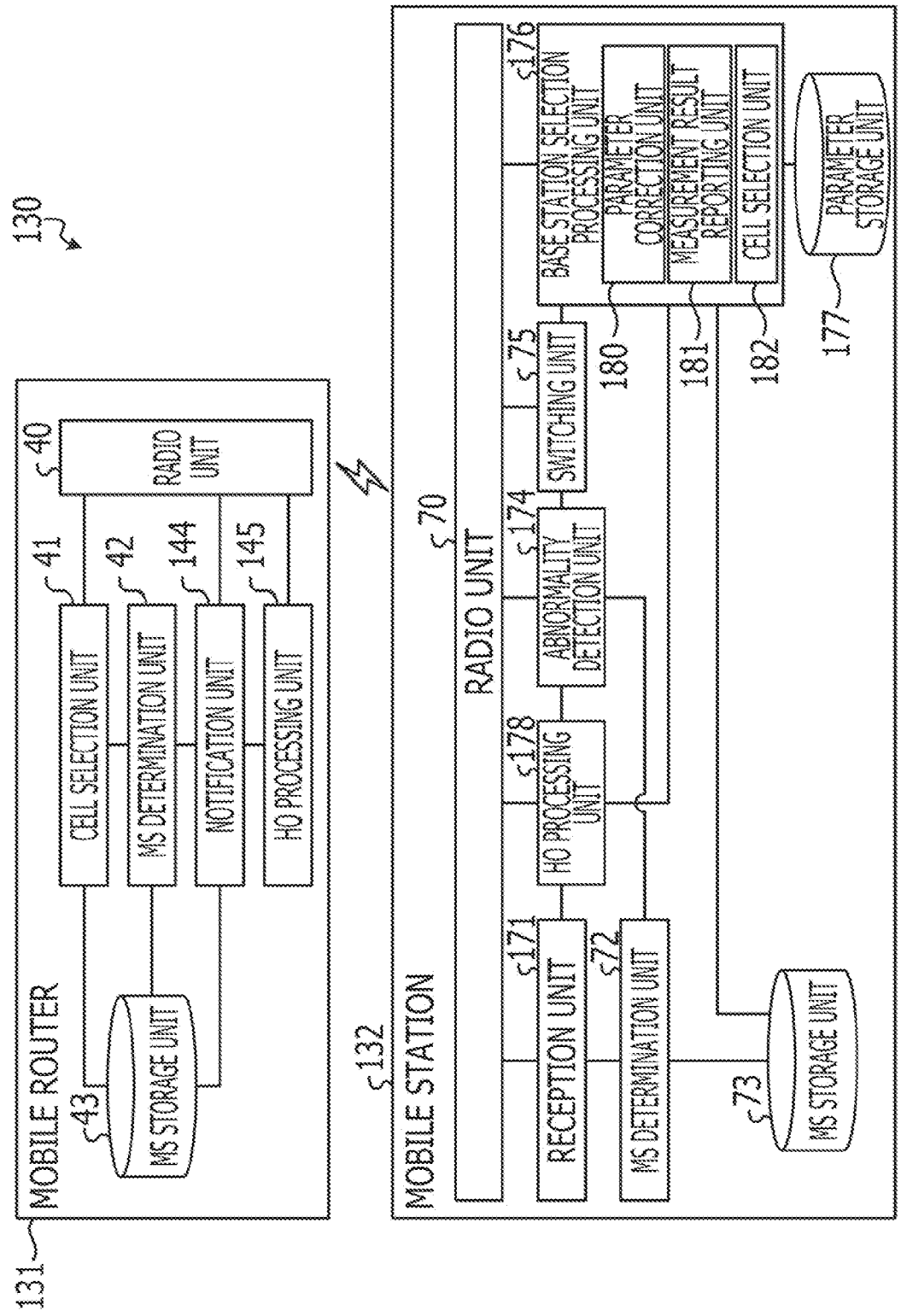
FIG. 6 is a block diagram illustrating a configuration of a radio communication system according to a third embodiment.

A configuration of a radio communication system according to the third embodiment will be first described. FIG. 6 is a block diagram illustrating a configuration of the radio communication system according to the third embodiment. As illustrated in FIG. 6, a radio communication system 130 according to the third embodiment includes a mobile router 131 and a mobile station 132. The mobile station 132 illustrated in FIG. 6 is assumed to be set in Active mode specified by LTE.

The mobile router 131 according to the third embodiment includes the radio unit 40, the cell selection unit 41, the MS determination unit 42, the MS storage unit 43, a notification unit 144, and an HO (Handover) processing unit 145. In the following, constituent components of the mobile router 131 having substantially similar functions to the functions of the corresponding constituent components illustrated in FIG. 3 will be designated by the same reference numerals, and detailed description thereof will be omitted.

The HO processing unit 145 performs a variety of processes for performing handover processing with the mobile station 132. Specifically, the HO processing unit 145 transmits to the mobile station 132 a measurement command message for commanding the mobile station 132 to calculate the left and right sides of the measurement result report evaluation formula described later. Further, the HO processing unit 145 creates a handover command message for commanding the mobile station 132 to perform handover to a specified cell.

The notification unit 144 notifies the mobile station 132 of the mobility state information representing the mobility state of the mobile router 131. Specifically, the notification unit 144 reads and combines the mobility state of the mobile router 131 and the cell selection history stored in the MS storage unit 43 by the MS determination unit 42, to thereby create the mobility state information. Then, the notification unit 144 acquires the handover command message created by the HO processing unit 145, adds the mobility state information to the acquired handover command message, and notifies the mobile station 132 of the handover command message added with the mobility state information.

Each of the notification unit 144 and the HO processing unit 145 may be configured as an integrated circuit, such as an ASIC (Application Specific Integrated Circuit) or an FPGA (Field Programmable Gate Array), for example.

The mobile station 132 of the third embodiment includes the radio unit 70, a reception unit 171, the MS determination unit 72, the MS storage unit 73, an abnormality detection unit 174, the switching unit 75, a base station selection processing unit 176, a parameter storage unit 177, and an HO processing unit 178. In the following, constituent components of the mobile station 132 having substantially similar functions to the functions of the corresponding constituent components illustrated in FIG. 3 will be designated by the same reference numerals, and detailed description thereof will be omitted.

The HO processing unit 178 performs a variety of processes for performing handover processing with the mobile router 131 or a base station. Specifically, the HO processing unit 178 receives the measurement command message from the mobile router 131 or a base station, and notifies a measurement result reporting unit 181 of the base station selection processing unit 176 of the received measurement command message. Further, the HO processing unit 178 receives the handover command message from the mobile router 131 or a base station, and notifies a later-described cell selection unit 182 of the base station selection processing unit 176 of the received handover command message. Further, if the handover command message received from the mobile router 131 is added with the mobility state information of the mobile router 131, the HO processing unit 178 notifies the reception unit 171 of the added mobility state information of the mobile router 131.

The reception unit 171 receives from the HO processing unit 178 the mobility state information of the mobile router 131 notified from the mobile router 131, and notifies the MS determination unit 72 of the received mobility state information of the mobile router 131.

The abnormality detection unit 174 detects abnormality of the mobile router 131. Specifically, upon detection of the handover command message including the mobility state information, which is notified to the base station selection processing unit 176 from the HO processing unit 178, the abnormality detection unit 174 detects the occurrence of an overload on the mobile router 131 as abnormality. Further, upon detection of abnormality of the mobile router 131, the abnormality detection unit 174 notifies the MS determination unit 72 and the switching unit 75 of the detection of abnormality.

If the switching unit 75 switches the device to be communicated with by radio from the mobile router 131 to a base station, the base station selection processing unit 176 performs the process of selecting the base station on the basis of the mobility state information notified from the mobile router 131. Specifically, the base station selection processing unit 176 includes a parameter correction unit 180, the measurement result reporting unit 181, and the cell selection unit 182.

In accordance with the mobility state of the mobile router 131 represented by the mobility state information stored in the MS storage unit 73, the parameter correction unit 180 corrects a parameter included in the measurement result report evaluation formula. Herein, the measurement result report evaluation formula is a commonly used evaluation formula for evaluating the communication quality of a cell in the mobile station 132 in Active mode. The measurement result report evaluation formula is represented by, for example, the following formulae (3) and (4).

Report Start Condition:

$$Mn+Ofn+Ocn-Hys>Ms+Ofs+Ocs+Off \quad (3)$$

Report End Condition:

$$Mn+Ofn+Ocn+Hys<Ms+Ofs+Ocs+Off \quad (4)$$

Herein, Ms represents the radio field strength of transmitted radio waves in the serving cell, and Mn represents the radio field strength of transmitted radio waves in the neighboring cell. Further, Ofs represents the offset corresponding to the frequency of the serving cell, and Ofn represents the offset corresponding to the frequency of the neighboring cell. Further, Ocs represents the offset corresponding to the serving cell, and Ocn represents the offset corresponding to the neighboring cell. Further, Hys represents the hysteresis set to correspond to the entirety of the measurement result report evaluation formula, and Off represents the offset set to correspond to the entirety of the measurement result report evaluation formula.

The measurement result reporting unit 181 compares the left and right sides of the measurement result report evaluation formula. Then, if the report start condition is satisfied for a specified period (trigger period), the measurement result reporting unit 181 reports to the base station of the serving cell the respective radio field strengths of the transmitted radio waves in the serving cell and the transmitted radio waves in the neighboring cell as the measurement result, by using a measurement result report message. Thereafter, the measurement result reporting unit 181 continuously performs the report, and compares the left and right sides of the measurement result report evaluation formula. Then, if the report end condition is satisfied for a specified period (trigger period), the measurement result reporting unit 181 stops the report. The trigger period is a parameter included in the measurement result report evaluation formula.

The parameter correction unit 180 multiplies the trigger period included in the measurement result report evaluation formula by a correction coefficient preset in accordance with the mobility state, to thereby correct the parameter included in the measurement result report evaluation formula. For example, if the mobility state is Normal-mobility state indicating low-speed movement, the parameter correction unit 180 does not make a particular correction. Meanwhile, if the mobility state is High-mobility state indicating high-speed movement, the parameter correction unit 180 multiplies the trigger period by the correction coefficient to reduce the trigger period. Then, the parameter correction unit 180 stores the corrected parameter in the parameter storage unit 177.

The measurement result reporting unit 181 reads from the parameter storage unit 177 the parameter corrected by the parameter correction unit 180, and determines whether or not the report start condition is satisfied by using the measurement result report evaluation formula including the corrected parameter. Then, if the report start condition is satisfied, the measurement result reporting unit 181 reports the measurement result to the base station of the serving cell.

Specifically, upon receipt of the measurement command message from the mobile router 131 or a base station, the measurement result reporting unit 181 calculates the left and right sides of the measurement result report evaluation formula. The measurement result reporting unit 181 then compares the left and right sides of the measurement result report evaluation formula. Then, if the report start condition is satisfied for the corrected specified time, the measurement result reporting unit 181 reports to the base station of the serving cell the respective radio field strengths of the transmitted radio waves in the serving cell and the transmitted radio waves in the neighboring cell as the measurement result, by using the measurement result report message.

Upon receipt of the handover command message from the HO processing unit 178, the cell selection unit 182 performs a process of selecting the base station forming the handover target cell specified by the handover command message. Further, if the mobile station 132 becomes normally communicable with the selected base station, the cell selection unit 182 transmits a handover confirm message to the base station, and establishes connection with the base station.

The parameter storage unit 177 is a storage unit for storing the parameter corrected by the parameter correction unit 180. Specifically, the parameter storage unit 177 stores the trigger period, which is a parameter of the measurement result report evaluation formula corrected by the parameter correction unit 180, the hysteresis, the offset, and so forth.

Each of the reception unit 171, the abnormality detection unit 174, the base station selection processing unit 176, and the HO processing unit 178 may be configured as an integrated circuit, such as an ASIC or an FPGA, for example. Further, the parameter storage unit 177 may be configured as a semiconductor memory element, such as a RAM, an EPROM, or a flash memory, for example.

[Processing Procedure by Radio Communication System According to Third Embodiment]

Figure 7B:
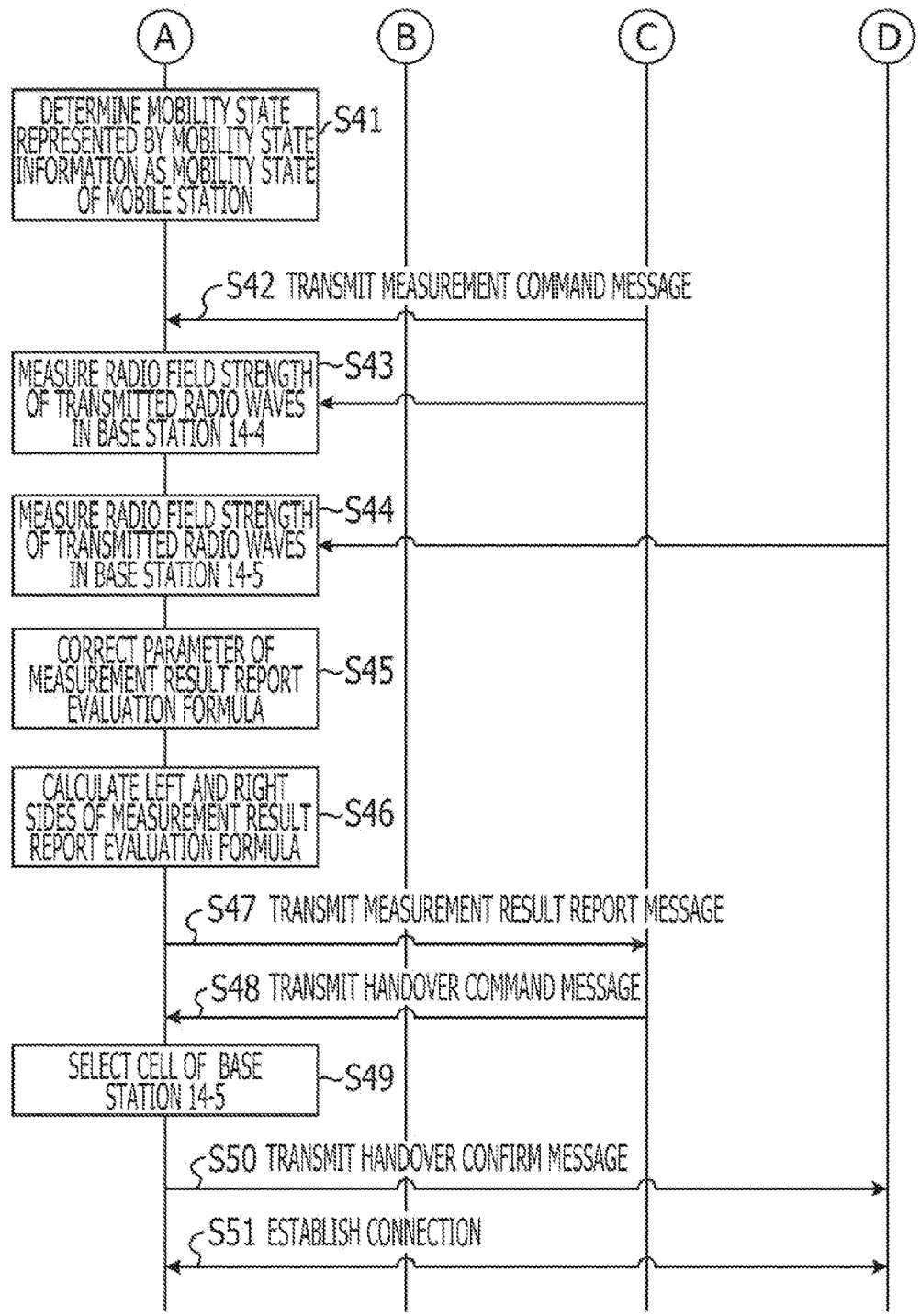

Subsequently, a processing procedure performed by the radio communication system 130 according to the third embodiment will be described. FIGS. 7A and 7B is a sequence diagram illustrating a processing procedure performed by the radio communication system 130 according to the third embodiment. In FIGS. 7A and 7B, description will be made of a processing procedure in which the mobile station 132 corresponding to the mobile station 12 illustrated in FIG. 2 switches the device to be communicated therewith in the order of the mobile router 131 corresponding to the mobile relay station 11, the base station 14-4, and the base station 14-5. Further, the mobile router 131 is assumed to be connected to the cell of the base station 14-4. It is also assumed that the mobility state of the mobile router 131 connected to the cell of the base station 14-4 is High-mobility state, and that the mobility state of the mobile station 132 connected to the cell of the mobile router 131 is Normal-mobility state.

As illustrated in FIGS. 7A and 7B, the mobile station 132 has established connection with the mobile router 131, which is the device to be communicated therewith (Operation S31). Then, the HO processing unit 145 of the mobile router 131 transmits the measurement command message to the mobile station 132 (Operation S32). Then, as the report start condition of the measurement result report evaluation formula is satisfied, the measurement result reporting unit 181 of the base station selection processing unit 176 in the mobile station 132 reports the measurement result to the mobile router 131 by using the measurement result report message (Operation S33).

Thereafter, if an overload is imposed on the mobile router 131 (Operation S34), the HO processing unit 145 of the mobile router 131 creates the handover command message for commanding the mobile station 132 to perform handover to the cell of the base station 14-4 (Operation S35). Then, the notification unit 144 creates the mobility state information including the mobility state of the mobile router 131 (High-mobility state in this case) and the cell selection history. Then, the notification unit 144 acquires the handover command message created by the HO processing unit 145, adds the mobility state information to the acquired handover command message, and notifies the mobile station 132 of the handover command message (Operation S36).

Meanwhile, the abnormality detection unit 174 of the mobile station 132 detects the handover command message including the mobility state information, which is notified to the base station selection processing unit 176 from the HO processing unit 178, and thus detects the occurrence of an overload on the mobile router 131 as abnormality (Operation S37).

Then, notified from the abnormality detection unit 174 that abnormality of the mobile router 131 has been detected, the switching unit 175 switches the device to be communicated with the mobile station 132 from the mobile router 131 to the base station 14-4 (Operation S38). Then, if the mobile station 132 becomes normally communicable with the base station 14-4, the switching unit 75 transmits the handover confirm message to the base station 14-4 (Operation S39), and establishes connection with the base station 14-4 (Operation S40).

Meanwhile, notified from the abnormality detection unit 174 that abnormality of the mobile router 131 has been detected, the MS determination unit 72 determines, as the mobility state of the mobile station 132, the mobility state represented by the mobility state information notified at Operation S36 (Operation S41). In this case, High-mobility state, which is the mobility state of the mobile router 131 represented by the mobility state information, is determined as the mobility state of the mobile station 132. Thereby, the mobility state of the mobile station 132 is changed from Normal-mobility state to High-mobility state.

In the process of Operation S41, the MS determination unit 72 acquires, from the cell selection history represented by the mobility state information notified at Operation S36, the number of cells selected per specified time by the mobile router 131. Then, the MS determination unit 72 continuously updates the mobility state of the mobile station 132 in accordance with the acquired number of cells per specified time.

Then, if the mobile station 132 receives the measurement command message from the base station 14-4 (Operation S42), the measurement result reporting unit 181 of the base station selection processing unit 176 measures the radio field strength of the transmitted waves in the serving cell formed by the base station 14-4 (Operation S43). Further, the measurement result reporting unit 181 of the base station selection processing unit 176 measures the radio field strength of the transmitted waves in the neighboring cell formed by the base station 14-5 (Operation S44).

In accordance with the mobility state of the mobile router 131 determined as the mobility state of the mobile station 132 by the MS determination unit 72, the parameter correction unit 180 of the base station selection processing unit 176 corrects a parameter included in the measurement result report evaluation formula (Operation S45). Then, the measurement result reporting unit 181 calculates the left and right sides of the measurement result report evaluation formula (Operation S46). The measurement result reporting unit 181 then compares the left and right sides of the measurement result report evaluation formula. Then, the report start condition is satisfied for a specified time, and thus the measurement result reporting unit 181 reports the measurement result obtained at Operations S43 and S44 to the base station 14-4 by using the measurement result report message (Operation S47).

Then, on the basis of the measurement result, the base station 14-4 having received the measurement result report message commands the mobile station 132 to perform handover to the cell of the base station 14-5, by using the handover command message (Operation S48). Then, the cell selection unit 182 of the base station selection processing unit 176 in the mobile station 132 selects the cell of the base station 14-5 specified by the handover command message (Operation S49). Then, if the mobile station 132 becomes normally communicable with the base station 14-5, the cell selection unit 182 of the base station selection processing unit 176 transmits the handover confirm message to the base station 14-5 (Operation S50), and establishes connection with the base station 14-5 (Operation S51).

[Effects of Third Embodiment]

As described above, in the radio communication system 130 according to the third embodiment, in accordance with the mobility state represented by the mobility state information notified from the mobile router 131, the mobile station 132 corrects a parameter included in the measurement result report evaluation formula for Active mode. Then, with the use of the measurement result report evaluation formula including the corrected parameter, the mobile station 132 selects the cell of the device to be connected thereto. Therefore, the third embodiment is capable of achieving prompt selection of a cell by the mobile station 132, even if the mobile station 132 in Active mode specified by LTE switches the device to be communicated therewith from the mobile router 131 to a base station.

In the above-described second embodiment, description has been made of the example in which, if the amount of change in a parameter of the cell selection evaluation formula received from the mobile router 31 exceeds a specified threshold value, the mobile station 32 detects an overload on the mobile router 31 as abnormality, and switches the device to be communicated therewith from the mobile router 31 to a base station. However, the mobile station may switch the device to be communicated therewith from the mobile router to a base station, if the mobile station directly receives from the mobile router a command to switch the device to be communicated with from the mobile router to the base station. In a fourth embodiment, therefore, description will be made of an example in which the mobile station switches the device to be communicated therewith from the mobile router to a base station, if the mobile station receives from the mobile router a command to switch the device to be communicated with from the mobile router to the base station.

[Configuration of Radio Communication System According to Fourth Embodiment]

A configuration of a radio communication system according to the fourth embodiment will be first described. FIG. 8 is a block diagram illustrating a configuration of a radio communication system 230 according to the fourth embodiment. As illustrated in FIG. 8, the radio communication system 230 according to the fourth embodiment includes a mobile router 231 and a mobile station 232. The mobile station 232 illustrated in FIG. 8 is assumed to be set in Idle mode specified by LTE.

The mobile router 231 of the fourth embodiment includes the radio unit 40, the cell selection unit 41, the MS determination unit 42, the MS storage unit 43, the notification unit 44, and a load distribution command unit 245. In the following, constituent components of the mobile router 231 having substantially similar functions to the functions of the corresponding constituent components illustrated in FIG. 3 will be designated by the same reference numerals, and detailed description thereof will be omitted.

The load distribution command unit 245 monitors a communication load imposed on the mobile router 231. If an overload is imposed on the mobile router 231, the load distribution command unit 245 transmits to the mobile station 232 a load distribution message for commanding the mobile station 232 to switch the device to be communicated therewith from the mobile router 231 to a base station. The load distribution command unit 245 may be configured as an integrated circuit, such as an ASIC or an FPGA, for example.

The mobile station 232 of the fourth embodiment includes the radio unit 70, the reception unit 71, the MS determination unit 72, the MS storage unit 73, an abnormality detection unit 274, the switching unit 75, the base station selection processing unit 76, and the parameter storage unit 77. In the following, constituent components of the mobile station 232 having substantially similar functions to the functions of the corresponding constituent components illustrated in FIG. 3 will be designated by the same reference numerals, and detailed description thereof will be omitted.

The abnormality detection unit 274 detects abnormality of the mobile router 231. Specifically, upon receipt of the load distribution message from the mobile router 231, the abnormality detection unit 274 detects the occurrence of an overload on the mobile router 231 as abnormality. Further, upon detection of abnormality of the mobile router 231, the abnormality detection unit 274 notifies the MS determination unit 72 and the switching unit 75 of the detection of abnormality. The abnormality detection unit 274 may be configured as an integrated circuit, such as an ASIC or an FPGA, for example.

[Processing Procedure by Radio Communication System According to Fourth Embodiment]

Figure 9:
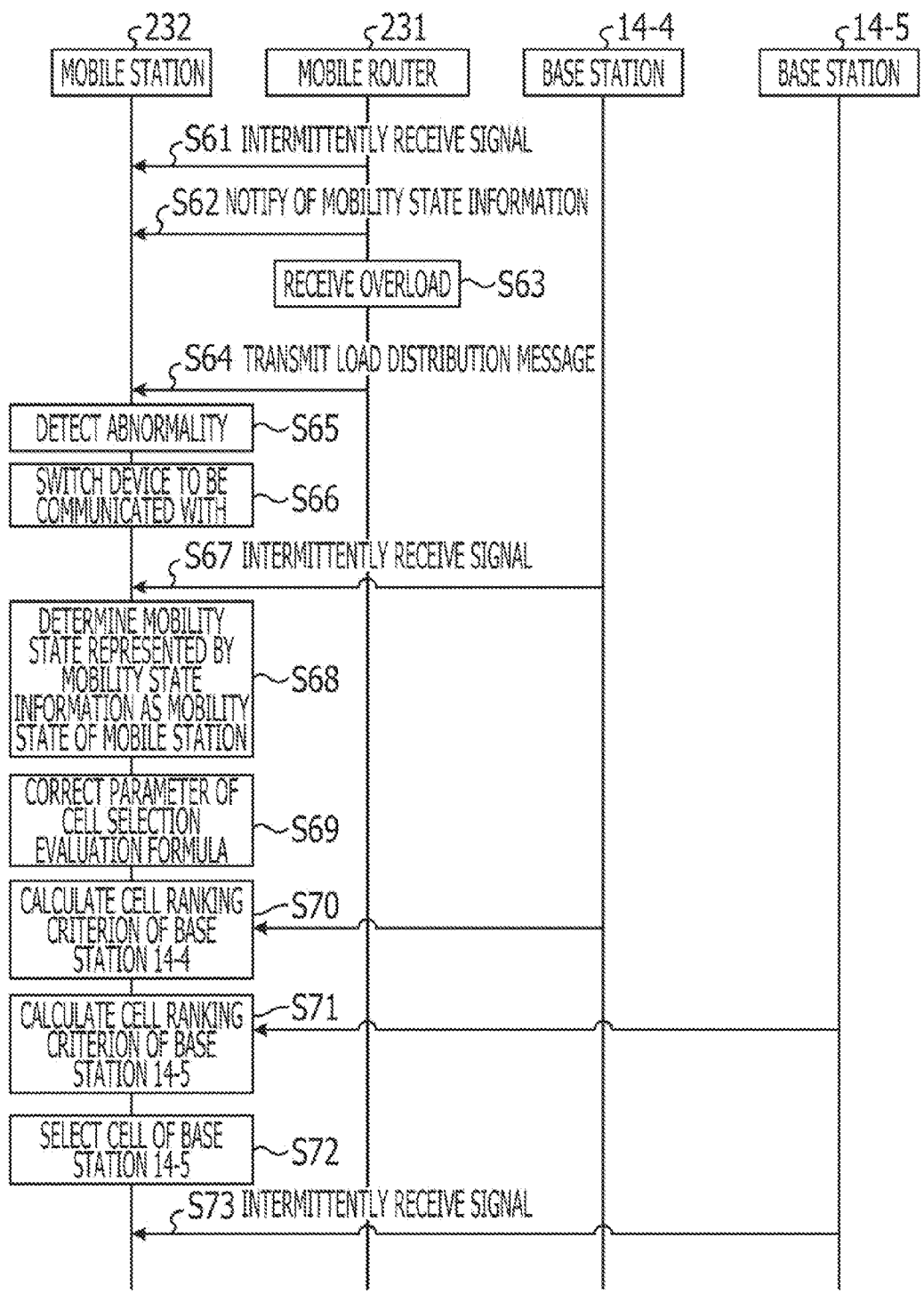
FIG. 9 is a sequence diagram illustrating a processing procedure performed by the radio communication system according to the fourth embodiment.

Subsequently, a processing procedure performed by the radio communication system 230 according to the fourth embodiment will be described. FIG. 9 is a sequence diagram illustrating a processing procedure performed by the radio communication system 230 according to the fourth embodiment. In FIG. 9, description will be made of a processing procedure in which the mobile station 232 corresponding to the mobile station 12 illustrated in FIG. 2 switches the device to be communicated therewith in the order of the mobile router 231 corresponding to the mobile relay station 11, the base station 14-4, and the base station 14-5. Further, the mobile router 231 is assumed to be connected to the cell of the base station 14-4. It is also assumed that the mobility state of the mobile router 231 connected to the cell of the base station 14-4 is High-mobility state, and that the mobility state of the mobile station 232 connected to the cell of the mobile router 231 is Normal-mobility state. Further, detailed description of processing operations similar to the processing operations already described in FIG. 5 (Operations S61 to S63 and Operations S66 to S73) will be omitted here.

As illustrated in FIG. 9, the mobile station 232 intermittently receives a signal for broadcasting from the mobile router 231, and the notification unit 44 of the mobile router 231 notifies, by broadcasting, the mobile station 232 of the mobility state information (Operations S61 and S62).

Thereafter, if an overload is imposed on the mobile router 231 (Operation S63), the load distribution command unit 245 transmits to the mobile station 232 the load distribution message for commanding the mobile station 232 to switch the device to be communicated therewith from the mobile router 231 to the base station 14-4 (Operation S64).

Meanwhile, upon receipt of the load distribution message from the mobile router 231, the abnormality detection unit 274 of the mobile station 232 detects the occurrence of an overload on the mobile router 231 as abnormality (Operation S65).

Then, notified from the abnormality detection unit 274 that abnormality of the mobile router 231 has been detected, the switching unit 75 switches the device to be communicated with the mobile station 232 to the base station 14-4 (Operation S66). Thereafter, the mobile station 232 performs a process of selecting the base station 14-5 on the basis of the mobility state information notified from the mobile router 231 (Operations S67 to S73).

[Effects of Fourth Embodiment]

As described above, in the radio communication system 230 according to the fourth embodiment, upon receipt of the load distribution message from the mobile router 231, the mobile station 232 detects an overload on the mobile router 231 as abnormality, and switches the device to be communicated therewith to a base station. Therefore, the fourth embodiment is capable of promptly detecting the overload on the mobile router 231. Consequently, the fourth embodiment is capable of achieving prompt selection of a cell by the mobile station 232, even if the mobile station 232 switches the device to be communicated therewith to a base station owing to the overload on the mobile router 231.

In the above-described second embodiment, description has been made of the example in which, upon detection of an overload as abnormality of the mobile router, the mobile station switches the device to be communicated therewith from the mobile router to a base station. However, the mobile station may switch the device to be communicated therewith from the mobile router to a base station upon detection of a malfunction as abnormality of the mobile router. In a fifth embodiment, therefore, description will be made of an example in which the mobile station switches the device to be communicated therewith from the mobile router to a base station upon detection of a malfunction as abnormality of the mobile router.

[Configuration of Radio Communication System According to Fifth Embodiment]

Figure 10:
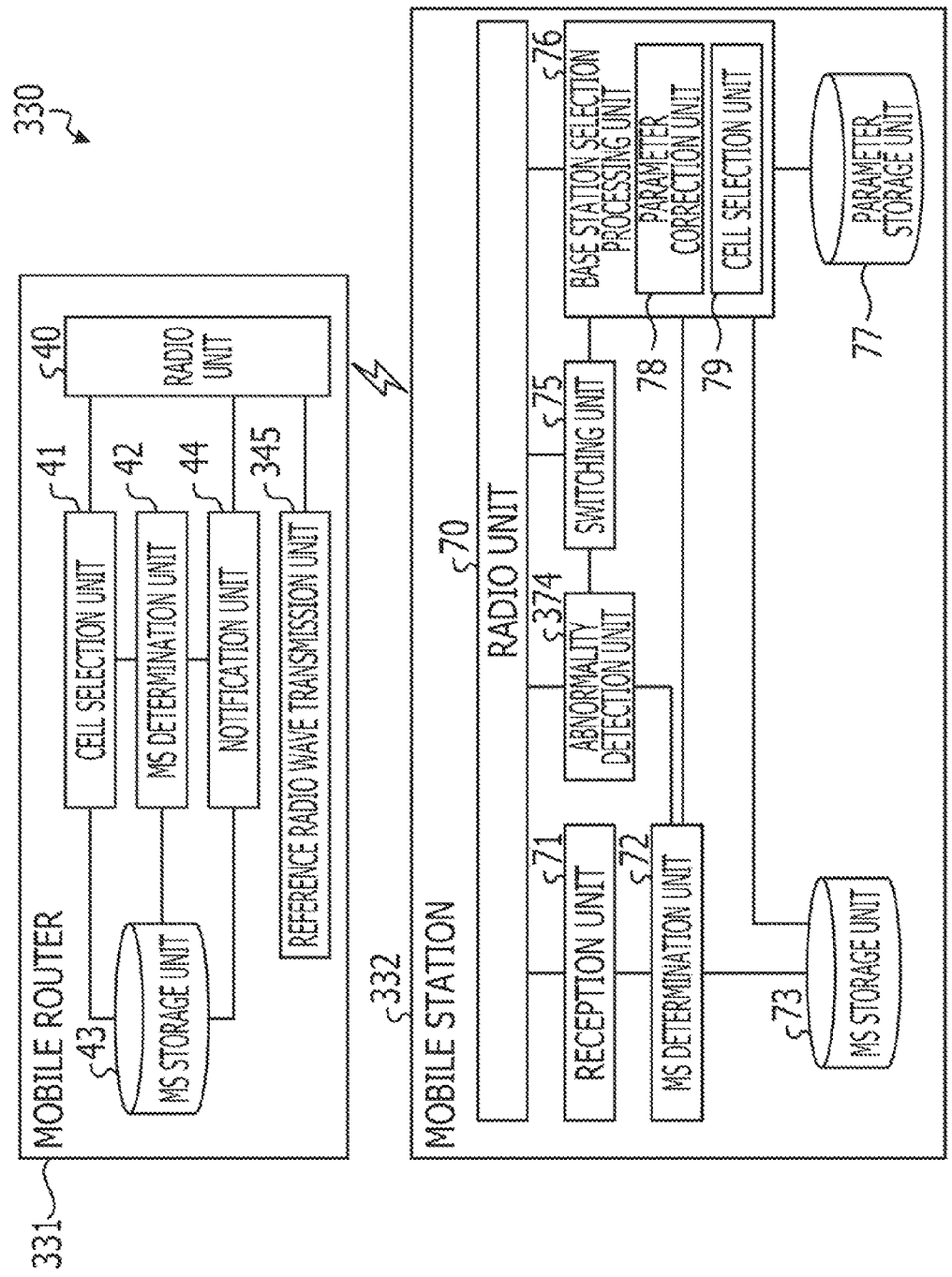
FIG. 10 is a block diagram illustrating a configuration of a radio communication system according to a fifth embodiment.

A configuration of a radio communication system according to the fifth embodiment will be first described. FIG. 10 is a block diagram illustrating a configuration of a radio communication system 330 according to the fifth embodiment. As illustrated in FIG. 10, the radio communication system 330 according to the fifth embodiment includes a mobile router 331 and a mobile station 332. The mobile station 332 illustrated in FIG. 10 is assumed to be set in Idle mode specified by LTE.

The mobile router 331 of the fifth embodiment includes the radio unit 40, the cell selection unit 41, the MS determination unit 42, the MS storage unit 43, the notification unit 44, and a reference radio wave transmission unit 345. In the following, constituent components of the mobile router 331 having substantially similar functions to the functions of the corresponding constituent components illustrated in FIG. 3 will be designated by the same reference numerals, and detailed description thereof will be omitted.

The reference radio wave transmission unit 345 periodically transmits to the mobile station 332 a reference radio wave, which is a known radio wave used to determine the quality of radio communication between the mobile router 331 and the mobile station 332. The reference radio wave transmission unit 345 may be configured as an integrated circuit, such as an ASIC or an FPGA, for example.

The mobile station 332 of the fifth embodiment includes the radio unit 70, the reception unit 71, the MS determination unit 72, the MS storage unit 73, an abnormality detection unit 374, the switching unit 75, the base station selection processing unit 76, and the parameter storage unit 77. In the following, constituent components of the mobile station 332 having substantially similar functions to the functions of the corresponding constituent components illustrated in FIG. 3 will be designated by the same reference numerals, and detailed description thereof will be omitted.

The abnormality detection unit 374 detects abnormality of the mobile router 331. Specifically, the abnormality detection unit 374 measures the radio field strength of the reference radio wave periodically transmitted from the mobile router 331. Then, if the measured radio field strength of the reference radio wave falls below a specified threshold value, the abnormality detection unit 374 detects the occurrence of a malfunction in the mobile router 331 as abnormality. Further, upon detection of abnormality of the mobile router 331, the abnormality detection unit 374 notifies the MS determination unit 72 and the switching unit 75 of the detection of abnormality. The abnormality detection unit 374 may be configured as an integrated circuit, such as an ASIC or an FPGA, for example.

[Processing Procedure by Radio Communication System According to Fifth Embodiment]

Figure 11:
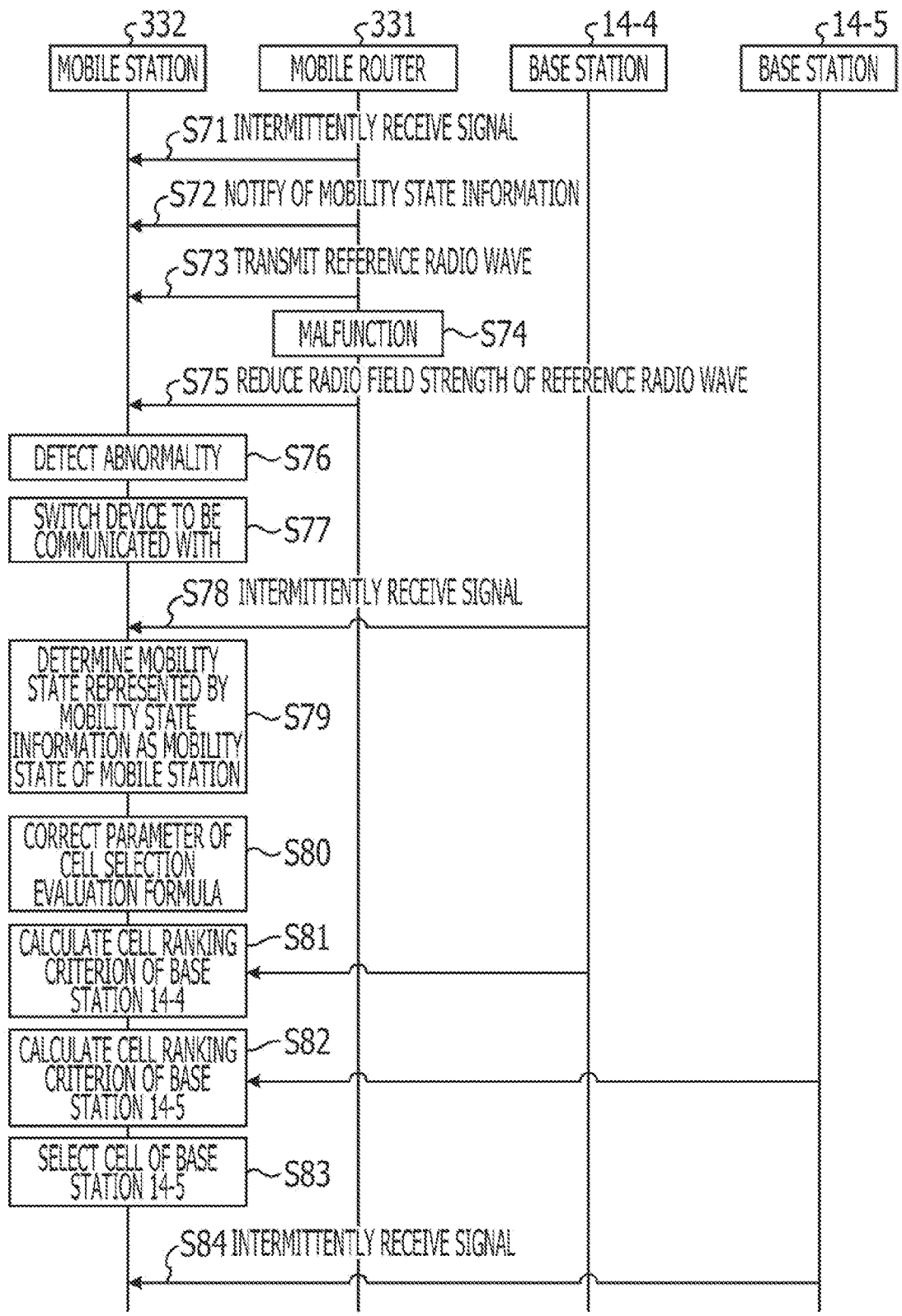
FIG. 11 is a sequence diagram illustrating a processing procedure performed by the radio communication system according to the fifth embodiment.
Figure 12:
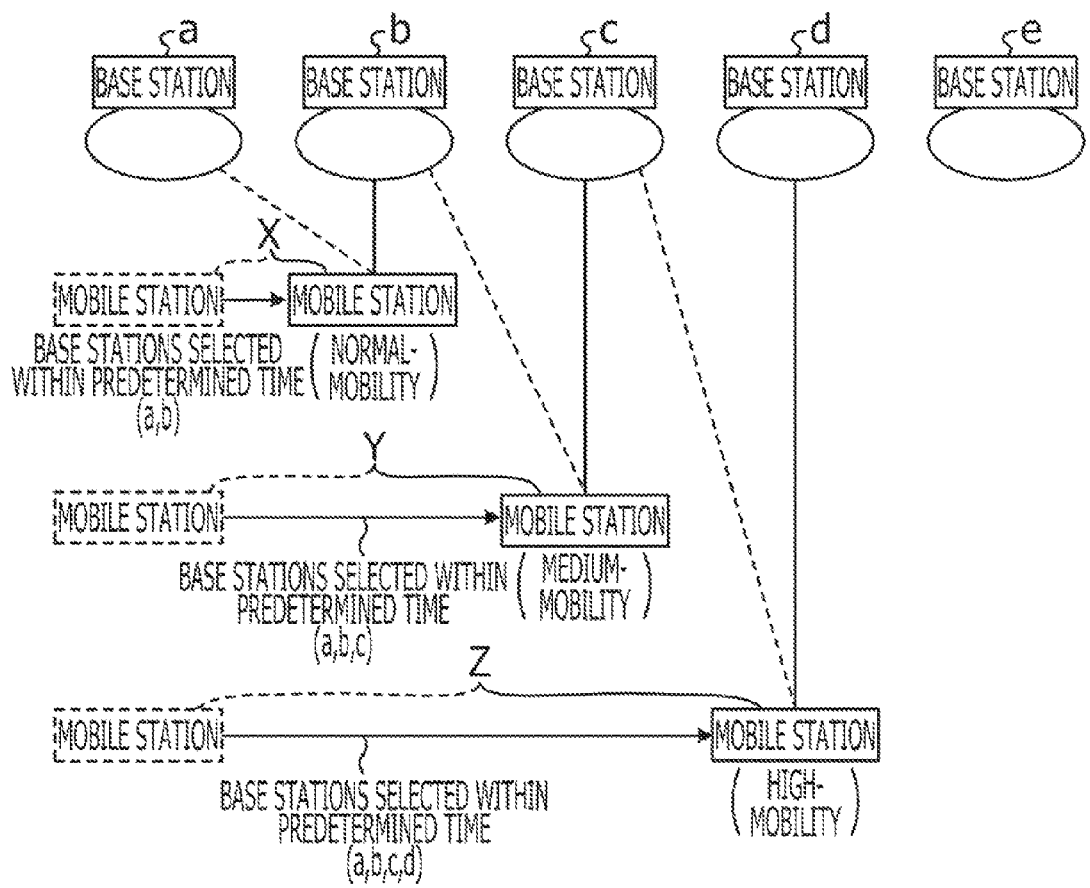
FIG. 12 is a diagram illustrating an example of a mobility state determination method performed by a mobile station.

Subsequently, a processing procedure performed by the radio communication system 330 according to the fifth embodiment will be described. FIG. 11 is a sequence diagram illustrating a processing procedure performed by the radio communication system 330 according to the fifth embodiment. In FIG. 11, description will be made of a processing procedure in which the mobile station 332 corresponding to the mobile station 12 illustrated in FIG. 2 switches the device to be communicated therewith in the order of the mobile router 331 corresponding to the mobile relay station 11, the base station 14-4, and the base station 14-5. Further, the mobile router 331 is assumed to be connected to the cell of the base station 14-4. It is also assumed that the mobility state of the mobile router 331 connected to the cell of the base station 14-4 is High-mobility state, and that the mobility state of the mobile station 332 connected to the cell of the mobile router 331 is Normal-mobility state. Further, detailed description of processing operations similar to the processing operations already described in FIG. 5 (Operations S71 and S72 and Operations S77 to S84) will be omitted here.

As illustrated in FIG. 11, the mobile station 332 intermittently receives a signal for broadcasting from the mobile router 331, and the notification unit 44 of the mobile router 331 notifies, by broadcasting, the mobile station 332 of the mobility state information (Operations S71 and S72). Further, the reference radio wave transmission unit 345 of the mobile router 331 periodically transmits the reference radio wave to the mobile station 332 (Operation S73).

Thereafter, if a malfunction occurs in the mobile router 331 (Operation S74), the radio field strength of the reference radio wave periodically transmitted from the reference radio wave transmission unit 345 is reduced (Operation S75). Meanwhile, as the radio field strength of the reference radio wave periodically transmitted from the mobile router 331 falls below a specified threshold value, the abnormality detection unit 374 of the mobile station 332 detects the occurrence of a malfunction in the mobile router 331 as abnormality (Operation S76).

Then, notified from the abnormality detection unit 374 that abnormality of the mobile router 331 has been detected, the switching unit 75 switches the device to be communicated with the mobile station 332 to the base station 14-4 (Operation S77). Thereafter, the mobile station 332 performs a process of selecting the base station 14-5 on the basis of the mobility state information notified from the mobile router 331 (Operations S78 to S84).

[Effects of Fifth Embodiment]

As described above, in the radio communication system 330 according to the fifth embodiment, upon detection of a malfunction as abnormality of the mobile router 331, the mobile station 332 forcibly switches the device to be communicated therewith from the mobile router 331 to a base station. Therefore, the fifth embodiment is capable of achieving prompt selection of a cell by the mobile station 332, even if the mobile station 332 switches the device to be communicated therewith from the mobile router 331 to a base station owing to the occurrence of a malfunction in the mobile router 331. As a result, the communication quality is improved, and a possibility of cut-off of the communication is reduced or prevented.

The radio communication systems 10, 30, 130, 230, and 330 described in the above first to fifth embodiments may also be implemented in a variety of different embodiments, as well as in the above-described first to fifth embodiments. In a sixth embodiment, therefore, another embodiment included in the above-described radio communication systems will be described.

The above-described first to fifth embodiments use, as the evaluation formula for evaluating the communication quality of a cell, the cell selection evaluation formula and the measurement result report evaluation formula. The above-described cell selection evaluation formula and measurement result report evaluation formula, however, are merely examples. Therefore, any other evaluation formula may be employed, as long as the evaluation formula is applicable to a mobile station which performs the cell selection by using the mobility state.

Further, in the above-described first to fifth embodiments, description has been made of the method of detecting the occurrence of an overload on the mobile router or a malfunction in the mobile router as abnormality of the mobile relay station (mobile router) by comparing the threshold with the amount of change in a parameter or the radio field strength of the reference radio wave. However, the disclosed technique is not limited thereto. If the abnormality of the mobile router includes another phenomenon, the cause for the other phenomenon may be determined to thereby detect the abnormality and switch the device to be communicated with the mobile station to a base station. For example, if an aged deterioration of the mobile relay station is assumed to be the abnormality of the mobile router, the years of use of the mobile relay station may be determined to thereby detect the abnormality and switch the device to be communicated with the mobile station to a base station.

Further, in the above-described fourth embodiment, description has been made of the example in which the mobile station in Idle mode detects an overload on the mobile router as abnormality upon receipt of the load distribution message from the mobile router. However, the mobile station in Active mode may detect an overload on the mobile router as abnormality upon receipt of the load distribution message from the mobile router.

Further, in the above-described fifth embodiment, description has been made of the example in which the mobile station in Idle mode compares the threshold with the radio field strength of the reference radio wave received from the mobile router, to thereby detect a malfunction of the mobile router as abnormality. However, the mobile station in Active mode may compare the threshold with the radio field strength of the reference radio wave received from the mobile router, to thereby detect a malfunction of the mobile router as abnormality.

The above-described embodiments, in which the mobility state is used in the handover processing, is capable of solving the issue of the mobile station under the command of the mobile relay station, which erroneously determines the mobility state as Normal-mobility state and thus fails to detect High-mobility state during a high-speed movement. That is, in the embodiments, the mobility state of the mobile relay station detected by the mobile relay station is notified from the mobile relay station to the mobile station under the command of the mobile relay station. Thereby, the mobile station moving at high speed similarly to the mobile relay station detects from the information received from the mobile relay station that the moving speed thereof corresponds to High-mobility state. Even in this single feature, the disclosed technique has an advantageous effect over the prior art. Further, the detected mobility state can also be used for, for example, a parameter determination control in the communication with a base station, as well as for the parameter applied to the handover as one of radio communication controls. For example, in a high-speed movement, it is possible to perform, with the mobility state, radio communication controls such as a control to reduce the number of antennas used in MIMO (Multiple-Input Multiple-Output) communication, a control not to perform the MIMO communication, and a control to use a communication form more robust than the communication form used in a low-speed movement.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A radio communication system comprising:
a plurality of base stations;
a mobile relay station configured to
    select a base station from among the plurality of base stations,
    relay radio communication between the selected base station and a mobile station, and
    notify the mobile station of mobility state information of the mobile relay station determined based on a number of base stations selected within a specified time; and
the mobile station configured to select a base station based on the mobility state information when the mobile station switches a device to be communicated with from the mobile relay station.

2. The radio communication system according to claim 1, wherein the mobile station is further configured to:
    detect an abnormality of the mobile relay station, and
    switch the device to be communicated with from the mobile relay station to the base station when the abnormality is detected, and
    select the base station based on the mobility state information when the device to be communicated with is switched to the base station.

3. The radio communication system according to claim 2, wherein the mobile station is further configured to:
    receive a parameter included in a specified evaluation formula for evaluating a communication quality of a cell, and
    detect an occurrence of an overload on the mobile relay station as the abnormality when an amount of change in the parameter exceeds a specified threshold value.

4. The radio communication system according to claim 2, wherein
    the mobile relay station is further configured to transmit to the mobile station a reference radio wave which is a radio wave used to determine a radio communication quality between the mobile relay station and the mobile station, and
    the mobile station is further configured to measure a radio field strength of the reference radio wave transmitted from the mobile relay station, and detect an occurrence of a malfunction in the mobile relay station as the abnormality when the radio field strength falls below a specified threshold value.

5. The radio communication system according to claim 1, wherein the mobile station is further configured to:
    correct, in accordance with the mobility state information, a parameter included in a specified evaluation formula for evaluating a communication quality of a cell, and
    select the base station by using the specified evaluation formula including the corrected parameter.

6. A mobile relay station to relay radio communication between a base station and a mobile station, the mobile relay station comprising:
    a processor configured to
        select a base station from among a plurality of base stations, and
        determine mobility state information of the mobile relay station based on a number of base stations selected by the processer within a specified time; and
    a transmitter to notify the mobile station of the mobility state information of the mobile relay station.

7. A mobile station that performs radio communication with a base station, which is relayed by a mobile relay station, the mobile station comprising:
    a receiver configured to receive mobility state information determined based on a number of base stations selected by the mobile relay station within a specified time, the mobility state information indicating the mobility state of the mobile relay station; and
    a selector to select a base station based on mobility state information when a device to be communicated with the mobile station is switched from the mobile relay station.

8. A radio communication method of a mobile station that performs radio communication with a base station, which is relayed by a mobile relay station, the method comprising:
    receiving mobility state information determined based on a number of base stations selected by the mobile relay station within a specified time, the mobility state information indicating the mobility state of the mobile relay station; and
    selecting a base station based on the mobility state information when a device to be communicated with the mobile station is switched from the mobile relay station.

* * * * *